US011498216B2

(12) United States Patent
Saruta et al.

(10) Patent No.: US 11,498,216 B2
(45) Date of Patent: Nov. 15, 2022

(54) REMOTE CONTROL MANIPULATOR SYSTEM AND CONTROL DEVICE

(71) Applicant: Mitsubishi Electric Corporation, Chiyoda-ku (JP)

(72) Inventors: Yusuke Saruta, Chiyoda-ku (JP); Masaki Haruna, Chiyoda-ku (JP); Noboru Kawaguchi, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 135 days.

(21) Appl. No.: 16/647,297

(22) PCT Filed: Sep. 21, 2018

(86) PCT No.: PCT/JP2018/035146
§ 371 (c)(1),
(2) Date: Mar. 13, 2020

(87) PCT Pub. No.: WO2019/059364
PCT Pub. Date: Mar. 28, 2019

(65) Prior Publication Data
US 2020/0215691 A1  Jul. 9, 2020

(30) Foreign Application Priority Data
Sep. 22, 2017  (JP) .............................. JP2017-182817

(51) Int. Cl.
*B25J 9/16* (2006.01)
*G08B 3/10* (2006.01)
*B25J 3/00* (2006.01)

(52) U.S. Cl.
CPC .............. *B25J 9/1689* (2013.01); *B25J 3/00* (2013.01); *B25J 9/1697* (2013.01); *G08B 3/10* (2013.01);
(Continued)

(58) Field of Classification Search
CPC . B25J 9/1689; B25J 3/00; B25J 9/1697; B25J 9/1671; G08B 3/10; G05B 2219/39449; G05B 2219/39451
See application file for complete search history.

(56) References Cited

U.S. PATENT DOCUMENTS 9,687,982 B1 * 6/2017 Jules ..................... B25J 9/161
9,718,190 B2 * 8/2017 Larkin .................... A61B 34/10
(Continued)

FOREIGN PATENT DOCUMENTS

| JP | 1-97983 A | 4/1989 |
| JP | 6-195127 A | 7/1994 |
| JP | 2009-66683 A | 4/2009 |

OTHER PUBLICATIONS

International Search Report dated Nov. 20, 2018 in PCT/JP2018/035146 filed on Sep. 21, 2018.
(Continued)

*Primary Examiner* — Abby Y Lin
*Assistant Examiner* — Dylan M Katz
(74) *Attorney, Agent, or Firm* — Oblon, McClelland, Maier & Neustadt, L.L.P.

(57) ABSTRACT

A remote control manipulator system includes a manipulator controlled remotely by an operator; a camera to capture an image including the manipulator; a posture sensor to detect posture data; an action instruction inputter with which the operator inputs an action instruction instructing action to move or stop the manipulator; a control device including a structural data storage to store manipulator structural data representing a structure of the manipulator, a model image generator to generate a model image with referring to the structural data storage and the posture data, and a presentation image generator to generate a presentation image by (Continued)

superimposing a model image on the captured image; and a display to display the presentation image.

20 Claims, 21 Drawing Sheets

(52) U.S. Cl.
CPC ... *B25J 9/1687* (2013.01); *G05B 2219/39449* (2013.01); *G05B 2219/39451* (2013.01)

(56) References Cited

U.S. PATENT DOCUMENTS

| | | | |
|---|---|---|---|
| 2005/0171635 A1* | 8/2005 | Furuta | B62D 57/032 700/245 |
| 2009/0326322 A1* | 12/2009 | Diolaiti | A61B 1/3132 600/112 |
| 2012/0004774 A1* | 1/2012 | Umetsu | B25J 15/0009 700/254 |
| 2013/0166070 A1 | 6/2013 | Zhao et al. | |
| 2014/0058564 A1* | 2/2014 | Zhao | A61B 34/30 700/259 |
| 2017/0181808 A1* | 6/2017 | Panescu | A61B 1/06 |
| 2020/0054399 A1* | 2/2020 | Duindam | A61B 34/20 |

OTHER PUBLICATIONS

Japanese Office Action dated Oct. 9, 2019 in Japanese Application No. 2019-543735 (with unedited computer-generated English translation), 6 total pages.

* cited by examiner (A)　　　　　　　　　　　　(B)

REMOTE CONTROL MANIPULATOR SYSTEM AND CONTROL DEVICE

TECHNICAL FIELD

The present disclosure relates to a remote control manipulator system and a control device that controls a manipulator remotely.

BACKGROUND ART

As a robot technology advances, a robot that can operate an operation target in a dynamic environment (an uncertain position, unknown model) is being developed from a robot or an automated machine used in a static environment (a known model placed in a fixed position). A robot having an automatic object recognition function and autonomous determination function using a camera and/or a laser range finder and a force sense control function using a force sensor that can perform measurement with multiple axes is being developed in order to be able to handle various situations.

As an important use need for the robot, the development of the robot that can support a person in the event of a major disaster is being advanced not only in Japan but also worldwide. In particular, a robot having a complex articulated structure is expected to be developed. Among them, there is a demand for controlling the robot by remote control and performing advanced work by using a hand of the robot.

The remote control of a conventional robot hand uses a pressure sensor and a force sensor on a hand side frequently (see Patent Literature 1).

CITATION LIST

Patent Literature

Patent Literature 1: Japanese Patent Laid-Open No. 2009-66683

SUMMARY OF INVENTION

Technical Problem

In a remote control system of the robot hand that uses many sensors, the amount of calculation required for the control becomes enormous, and a high-performance electronic computer is required for the control. Additionally, a software scale for the control becomes large, and the development becomes difficult and requires tremendous cost. In an autonomous robot hand systems, a problem of stability and reliability still remains.

The present disclosure has been made to solve the above problems, and an object of the present disclosure is to enable an operator to control a manipulator remotely and more easily than before with a simple system configuration.

Solution to Problem

According to one aspect of the present disclosure, a remote control manipulator system includes: a manipulator controlled remotely by an operator to handle an object; a camera to capture a captured image including the manipulator; a posture sensor to detect posture data representing a position and a posture of the manipulator; an action instruction inputter with which the operator inputs an action instruction instructing action to move or stop the manipulator; a control device including a control signal generator to generate a control signal controlling the manipulator from the action instruction, a structural data storage to store manipulator structural data representing a structure of the manipulator, a model image generator to generate a model image being an image of a model of the manipulator viewed from a position of the camera with referring to the manipulator structural data and the posture data, and a presentation image generator to generate a presentation image to be presented to the operator by superimposing the model image on the captured image; and a display to display the presentation image.

According to another aspect of the present disclosure, a control device includes: a control signal generator to which an action instruction is inputted by an operator using an action instruction inputter, the control signal generator generating a control signal controlling a manipulator to handle an object; a structural data storage to store manipulator structural data representing a structure of the manipulator; a model image generator to which posture data representing a position and a posture of the manipulator detected by a posture sensor and an image including the manipulator captured by a camera are inputted, the model image generator to generate a model image being an image of a model of the manipulator viewed from a position of the camera with referring to the posture data and the structural data storage; and a presentation image generator to generate a presentation image to be presented to the operator by superimposing the model image on the captured image.

Advantageous Effects of Invention

According to the present disclosure, the operator can control the manipulator remotely and more easily than in the past with a simple system configuration.

DESCRIPTION OF EMBODIMENTS

First Embodiment

Figure 1:
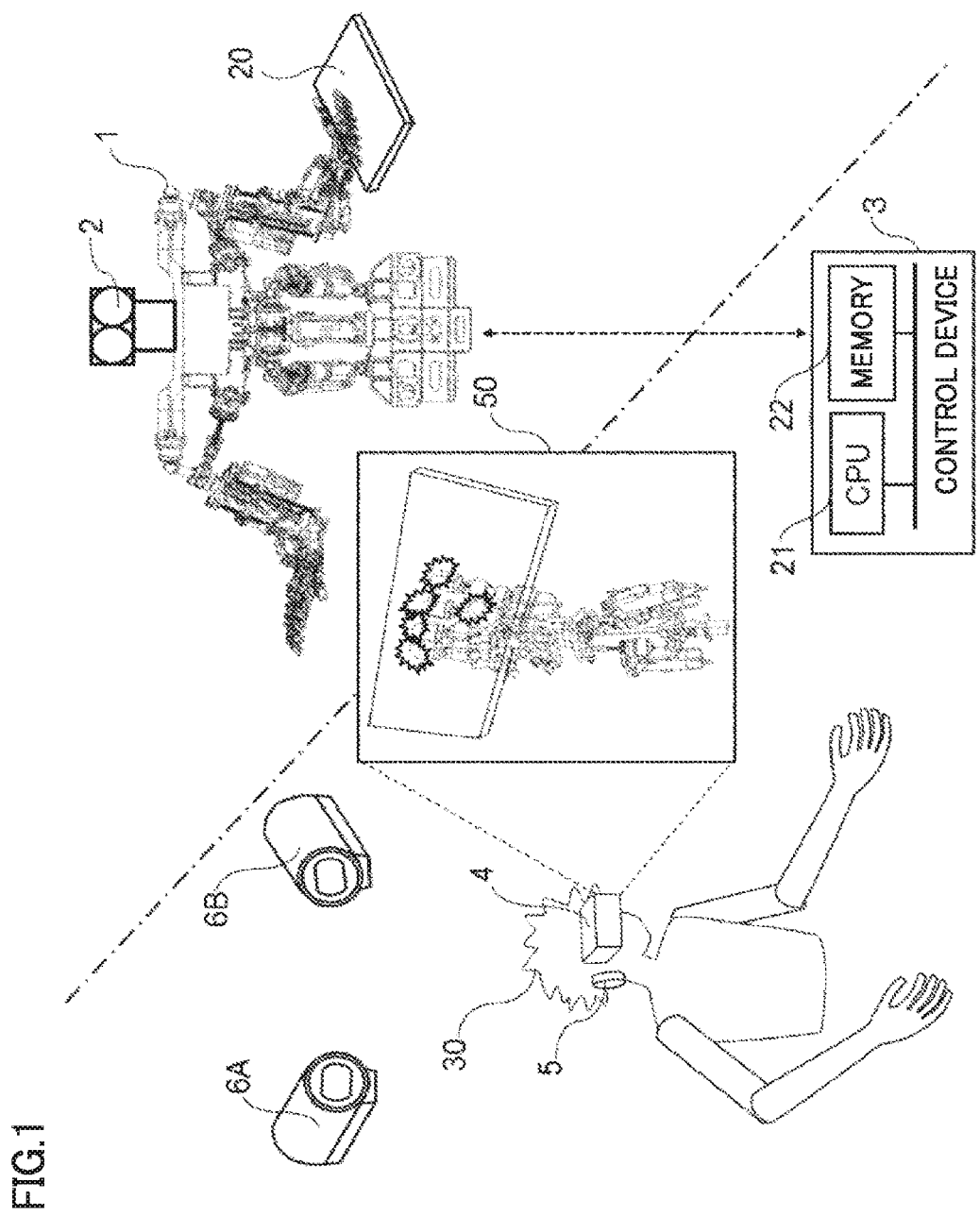
FIG. 1 is a view illustrating a schematic configuration of a remote control manipulator system according to a first embodiment of the present disclosure.
Figure 2:
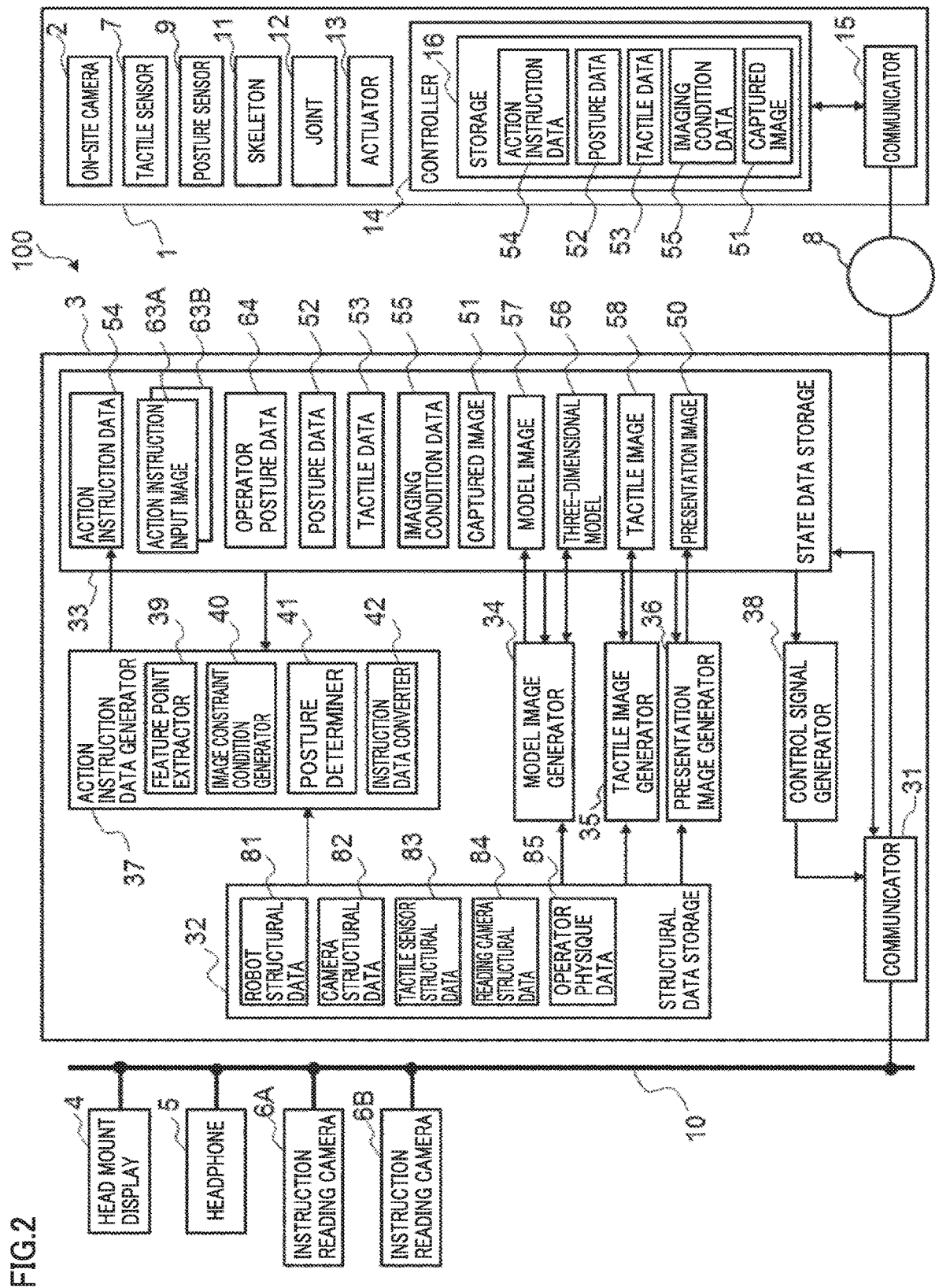
FIG. 2 is a block diagram illustrating a functional configuration of the remote control manipulator system of the first embodiment.

FIG. 1 is a view illustrating a schematic configuration of a remote control manipulator system according to a first embodiment of the present disclosure. FIG. 2 is a block diagram illustrating a functional configuration of the remote control manipulator system of the first embodiment. A remote control manipulator system 100 mainly includes a humanoid robot 1, an on-site camera 2, a control device 3, a head mount display 4 and headphones 5 that are worn by an operator 30, and instruction reading cameras 6A, 6B. Humanoid robot 1 is a manipulator that is controlled remotely by operator 30 to handle an object. On-site camera 2 captures an image of a state in which humanoid robot 1 handles an object 20 that is the operation target. Control device 3 controls humanoid robot 1 remotely. Operator 30 is an operator who gives an action instruction to humanoid robot 1. Instruction reading cameras 6A, 6B are two cameras that read the action of operator 30 as the action instruction. The actions performed by operator 30 and the humanoid robot include not only motion but also a standstill in an instructed posture. The action includes one or both of the motion and the standstill. A place where the humanoid robot 1 handles object 20 is called a site. The place where operator 30 works is called a command center.

Humanoid robot 1 has two arms and two legs. In the drawings, the humanoid robot 1 is illustrated with no leg portion. Because the simple action is better in the description of the features of the present disclosure, the case where object 20 is operated by moving one arm according to the action of operator 30 is described. On-site camera 2 is installed on a head of the humanoid robot 1. On-site camera 2 is a camera that captures a captured image 51 including an arm and a hand of humanoid robot 1 and object 20. On-site camera 2 includes a microphone, and detects sound generated around humanoid robot 1 and sound generated in operating object 20.

A presentation image 50 is an image obtained by superimposing an image displaying information from various sensors such as a tactile sensor 7 attached to humanoid robot 1 such that operator 30 can recognize easily on captured image 51 captured by on-site camera 2. By viewing presentation image 50, operator 30 recognizes a situation of humanoid robot 1 maneuvering. Presentation image 50 is generated by control device 3. Operator 30 wears head mount display 4 and headphones 5 on the head. Presentation image 50 is displayed on head mount display 4. Headphones 5 output the sound detected by the microphone of on-site camera 2. Headphone 5 can be controlled not to output the on-site sound based on determination of operator 30. Head mount display 4 is a display device that displays presentation image 50. Head mount display 4 may be a monitor that enables to perceive a depth. A large display installed on the wall of the command center or a display placed on a desk may be used as the display device. Headphone 5 is a sound generator that generates sound that can be heard by operator 30.

Control device 3 is constructed with a computer including a CPU 21 and a memory 22. The memory 22 stores a program executed by CPU 21, data used for processing, data obtained as a result of processing, and the like. Memory 22 is a semiconductor memory such as a flash memory, and a hard disk. Memory 22 includes a volatile storage device and a non-volatile storage device.

Humanoid robot 1 and control device 3 are connected to each other through a communication line 8, and communicate with each other. A control signal controlling humanoid robot 1 is sent from control device 3 through communication line 8. Posture data 52, tactile data 53, captured image 51, and the like are sent from humanoid robot 1. Posture data 52 is data representing a position and a posture of humanoid robot 1 detected by a posture sensor 9. Tactile data 53 is data detected by tactile sensor 7. Captured image 51 is an image captured by on-site camera 2. Communication line 8 may be a wired line or a wireless line, and may be a public line or a dedicated line. The communication line suitable for application is used. A distance between the site where humanoid robot 1 handles object 20 and the command station where the operator 30 works is arbitrary. The distance may be thousands of kilometers or 1 meter. Control device 3 is installed in a building where the command center is located. Control device 3 may be installed in a building different from the building where the command center is located. Head mount display 4 and instruction reading cameras 6A, 6B and control device 3 are connected to each other by a LAN 10. The remote control in this description means that the control is performed by a method for controlling a machine remotely. The actual distance between the machine such as humanoid robot 1 and control device 3 may not be remote.

Humanoid robot 1 mainly includes a skeleton 11, a joint 12, an actuator 13, a controller 14, and a communicator 15. Joint 12 connects two portions of skeleton 11 such that a connection angle can be changed. Actuator 13 generates force for moving joint 12. Controller 14 controls actuator 13. Communicator 15 communicates with control device 3. Action instruction data 54, posture data 52, and tactile data 53 extracted from the control signal are inputted to controller 14. Controller 14 includes a storage 16 that stores action instruction data 54, posture data 52, tactile data 53, and the like. Controller 14 controls actuator 13 such that posture data 52 coincides with action instruction data 54. The control performed by controller 14 may be feedback control or control based on low-order autonomous motion determination. When a robot in which gears are disposed at the joints to change the rotation angle of the joint using a motor, the controller controls the motor disposed in each joint.

On-site camera 2, tactile sensor 7, and posture sensor 9 are mounted on humanoid robot 1. On-site camera 2 is attached to the head of humanoid robot 1. On-site camera 2 can change an imaging direction, which is a direction in which an image is captured, by changing a direction to which the head faces. On-site camera 2 outputs imaging condition data 55, including the imaging direction, a diaphragm size, a magnification, and the like, in capturing the image to the controller 14 together with the captured image. The imaging direction is expressed as a direction relative to trunk 11A. Controller 14 sends captured image 51 and imaging condition data 55 to the control device 3 through communicator 15. Tactile sensor 7 is attached to a fingertip of humanoid robot 1. Tactile sensor 7 detects whether or not a finger of humanoid robot 1 and object 20 are in contact with each other, and measures magnitude of contact force acting between the object 20 and the fingertip when the finger of humanoid robot 1 and object 20 are in contact with each other. Tactile data 53 representing the state detected by tactile sensor 7 and including the contact force is sent to the controller 14, and used to control actuator 13. Tactile data 53 is sent to control device 3. Captured image 51, imaging condition data 55, and tactile data 53 are stored in storage 16 included in controller 14. Captured image 51 and imaging condition data 55 may be stored by a control device different from controller 14 of humanoid robot 1, and sent to control device 3. Storage 16 may be provided separately from controller 14.

Control device 3 mainly includes a communicator 31, a structural data storage 32, a state data storage 33, a model image generator 34, a tactile image generator 35, a presentation image generator 36, an action instruction data generator 37, and a control signal generator 38. Communicator 31 communicates with humanoid robot 1 and the like. Structural data storage 32 stores robot structural data 81 representing a structure of humanoid robot 1. Structural data storage 32 stores data that does not change. State data storage 33 stores changing data such as posture data 52. Model image generator 34 generates a model image 57 based on a three-dimensional model 56 of humanoid robot 1. Tactile image generator 35 generates a tactile image 58 that represents tactile data 53 visually. Presentation image generator 36 generates a presentation image 50 presented to operator 30. Action instruction data generator 37 generates action instruction data 54 from the images captured by instruction reading cameras 6A, 6B. Control signal generator 38 generates a control signal sending action instruction data 54 to humanoid robot 1. Three-dimensional model 56 is a three-dimensional model of humanoid robot 1 created according to the posture of humanoid robot 1 from robot structural data 81 and posture data 52. Model image 57 is an image in which three-dimensional model 56 is viewed from the position of on-site camera 2.

Structural data storage 32 and state data storage 33 correspond to memory 22 as hardware. Communicator 31, model image generator 34, tactile image generator 35, presentation image generator 36, action instruction data generator 37, and control signal generator 38 are implemented by causing CPU 21 to execute the dedicated program stored in memory 22.

Figure 3:
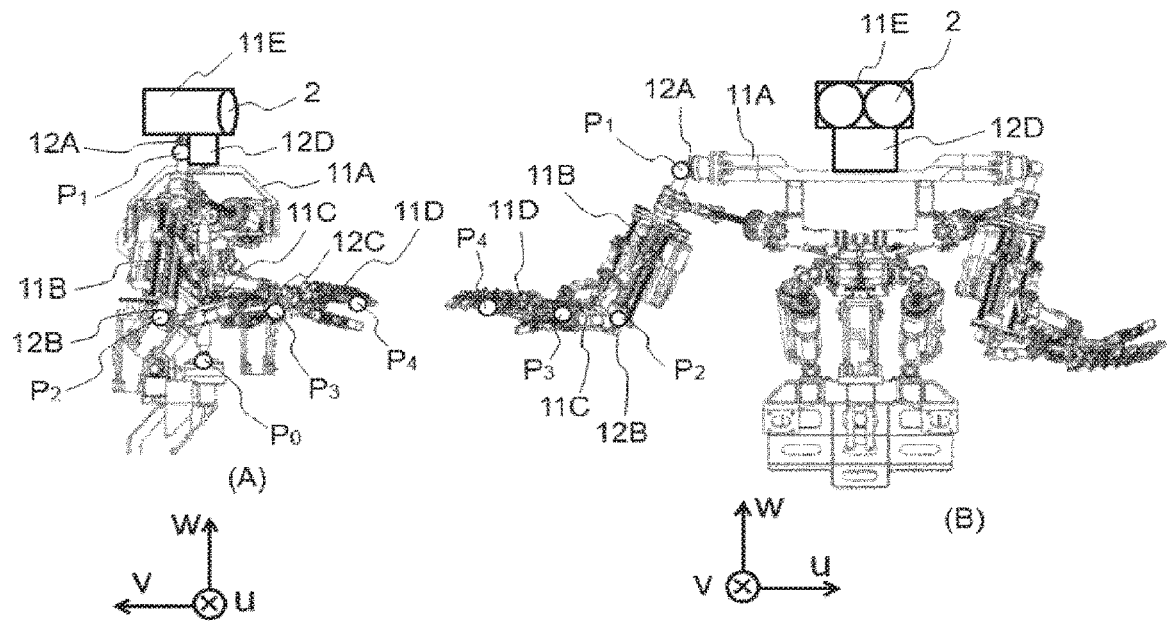
FIG. 3 is a front view and a left side view illustrating a humanoid robot used in the remote control manipulator system of the first embodiment.

A method for generating three-dimensional model 56 and model image 57 with reference to robot structural data 81 and posture data 52 is described. FIG. 3 is a front view and a left side view of the humanoid robot. FIG. 3(A) is the left side view, and FIG. 3(B) is the front view. Humanoid robot 1 includes a trunk 11A, an upper arm 11B, a forearm 11C, a hand 11D, and a head 11E as skeleton 11. Joint 12 includes a shoulder joint 12A, an elbow joint 12B, a wrist joint 12C, and a neck joint 12D. Hand 11D includes five fingers. Each finger includes three finger joints. Hereafter, for convenience, it is explained with assuming that a movable portion of hand 11D does not move.

A UVW-coordinate system is defined as a coordinate system representing a position of each portion of humanoid robot 1. It is assumed that a left-right direction of humanoid robot 1 is a U-axis, that a front-rear direction is a V-axis, and that an up-down direction is a W-axis. It is assumed that a direction from a right hand side toward a left hand side is a positive direction of the U-axis, that a direction from the front toward the rear is a positive direction of the V-axis, and that a direction from the bottom toward the top is a positive direction of the W-axis. It is assumed that a center of gravity $P_0$ of humanoid robot 1 located on a horizontal plane near a height of a waist is an origin of the UVW-coordinate. In trunk 11A, it is assumed that a positional relationship between shoulder joint 12A and center of gravity $P_0$ is fixed, and that coordinates of a point $P_1$ representing the position of right shoulder joint 12A are $(-W1, D1, H1)$.

One end of rod-shaped upper arm 11B is connected to trunk 11A at shoulder joint 12A. Shoulder joint 12A can change the connection angle between trunk 11A and the upper arm 11B. The other end of the upper arm 11B is connected to one end of rod-shaped forearm 11C at elbow joint 12B. Elbow joint 12B can change the connection angle between upper arm 11B and forearm 11C. Wrist joint 12C is provided at the other end of forearm 11C. Wrist joint 12C connects hand 11D to the other end of forearm 11C such that the connection angle can be changed. The length of upper arm 11B has a length La, and the length of forearm 11C has a length Lb. These connection relationships and the lengths do not change, and represent a structure of humanoid robot 1. Data representing the structure of humanoid robot 1 is robot structural data 81.

As to joint 12, a range of a value that can be taken by the connection angle at joint 12, a possible range of a change rate of the connection angle, and the like are defined as robot structural data 81. As to actuator 13, maximum values of force and torque generated by actuator 13, the possible range of the changing rate of the generating force and torque, and the like are defined as robot structural data 81. Robot structural data 81 is manipulator structural data representing the structure of the manipulator.

When the position of the on-site camera 2 relative to center of gravity $P_0$ is fixed, the position relative to center of gravity $P_0$ is stored as camera structural data 82. When head 11E on which on-site camera 2 is mounted can change an angle with respect to trunk 11A by neck joint 12D, the position of neck joint 12D relative to center of gravity $P_0$ and the distance between neck joint 12D and on-site camera 2 are stored as camera structural data 82. A relative direction in which on-site camera 2 fixed with respect to the direction in which the head 11E faces is also stored as camera structural data 82. Camera structural data 82 may include data, such as the vertical and horizontal sizes of the images that can be captured, a viewing angle, and a possible range of magnification, which is determined from specifications of on-site camera 2.

The structural data representing the structure of tactile sensor 7 includes a finger to be worn and a position within the finger to be worn. When detecting that the tactile sensor 7 is in contact, the position where tactile data 53 is displayed in tactile image 58 is also the structural data. These structural data are stored in structural data storage 32 as tactile sensor structural data 83. Multiple tactile sensors 7 may be mounted on one finger.

Figure 4:
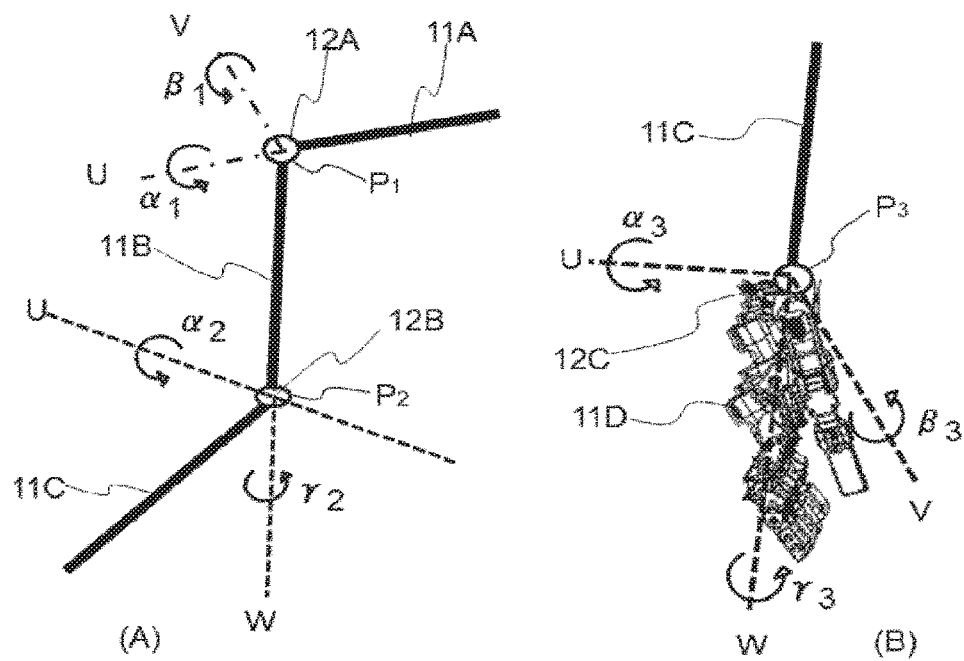
FIG. 4 is a view illustrating an example of posture data representing a posture of the humanoid robot used in the remote control manipulator system of the first embodiment.

Posture data 52 is described. FIG. 4 is a view illustrating an example of the posture data representing the posture of the humanoid robot. It is assumed that shoulder joint 12A is rotatable with two rotational degrees of freedom, and rotation angles of shoulder joint 12A are expressed with ($\alpha 1$, $\beta 1$) as illustrated in FIG. 4(A). It is assumed that elbow joint 12B is rotatable with two rotational degrees of freedom, and the rotation angles are expressed with ($\alpha 2$, $\gamma 2$) as illustrated in FIG. 4(A). It is assumed that wrist joint 12C is rotatable with three rotational degrees of freedom, and the rotation angles are expressed with ($\alpha 3$, $\beta 3$, $\gamma 3$) as illustrated in FIG. 4(B).

In shoulder joint 12A, an extending direction of upper arm 11B is expressed by a rotation angle $\alpha 1$ about the U-axis with respect to trunk 11A and a rotation angle $\beta 1$ about the V-axis with respect to trunk 11A. Elbow joint 12B connects forearm 11C to upper arm 11B so as to be rotatable with two rotational degrees of freedom. A connection angle between upper arm 11B and forearm 11C is expressed by the UVW-coordinate system that moves together with the upper arm 11B. The extending direction of upper arm 11B is the W-axis. In elbow joint 12B, the extending direction of the forearm 11C is expressed by a rotation angle $\alpha 2$ about the U-axis with respect to upper arm 11B and a rotation angle $\gamma 2$ about the W-axis with respect to upper arm 11B. It is assumed that the rotation angles of elbow joint 12B are ($\alpha 2$, $\gamma 2$) as illustrated in FIG. 4(A). Wrist joint 12C connects hand 11D to forearm 11C so as to be rotatable with three rotational degrees of freedom. The connection angle between forearm 11C and hand 11D is expressed by the UVW-coordinate system that moves together with forearm 11C. The extending direction of forearm 11C is the W-axis. It is assumed that the rotation angles of wrist joint 12C are ($\alpha 3$, $\beta 3$, $\gamma 3$) as illustrated in FIG. 4(B). In hand 11D, it is assumed that the position of a tip of an index finger relative to wrist joint 12C at the rotation angles ($\alpha 3$, $\beta 3$, $\gamma 3$)=(0, 0, 0) of wrist joint 12C is (W4, 0, H4).

The angle ($\alpha 1$, $\beta 1$), the angle ($\alpha 2$, $\gamma 2$), and the angle ($\alpha 3$, $\beta 3$, $\gamma 3$) are included in posture data 52 representing the posture of humanoid robot 1. In humanoid robot 1, posture data 52 can be expressed only by the rotation angles of joint 12. For example, for the humanoid robot that can expand and contract the length of the forearm, the length of the forearm is also included in the posture data. The posture data is defined such that the position and the posture of the humanoid robot (manipulator) can be expressed.

When the angle ($\alpha 1$, $\beta 1$), the angle ($\alpha 2$, $\gamma 2$) and the angle ($\alpha 3$, $\beta 3$, $\gamma 3$) are determined, the three-dimensional position of each portion of a right arm of humanoid robot 1 can be determined. It is assumed that a rotation matrix of shoulder joint 12A is [R1], that a rotation matrix of elbow joint 12B is [R2], and that a rotation matrix of wrist joint 12C is [R3]. The rotation matrices [R1], [R2], [R3] can be expressed as follows.

[Mathematical Formula 1]

$$[R1] = \begin{pmatrix} 1 & 0 & 0 \\ 0 & \cos\alpha 1 & -\sin\alpha 1 \\ 0 & \sin\alpha 1 & \cos\alpha 1 \end{pmatrix} \begin{pmatrix} \cos\beta 1 & 0 & -\sin\beta 1 \\ 0 & 1 & 0 \\ \sin\beta 1 & 0 & \cos\beta 1 \end{pmatrix} \quad (1)$$

[Mathematical Formula 2]

$$[R2] = \begin{pmatrix} 1 & 0 & 0 \\ 0 & \cos\alpha 2 & -\sin\alpha 2 \\ 0 & \sin\alpha 2 & \cos\alpha 2 \end{pmatrix} \begin{pmatrix} \cos\gamma 2 & -\sin\gamma 2 & 0 \\ \sin\gamma 2 & \cos\gamma 2 & 0 \\ 0 & 0 & 1 \end{pmatrix} \quad (2)$$

[Mathematical Formula 3]

$$[R3] = \begin{pmatrix} 1 & 0 & 0 \\ 0 & \cos\alpha 3 & -\sin\alpha 3 \\ 0 & \sin\alpha 3 & \cos\alpha 3 \end{pmatrix} \begin{pmatrix} \cos\beta 3 & 0 & -\sin\beta 3 \\ 0 & 1 & 0 \\ \sin\beta 3 & 0 & \cos\beta 3 \end{pmatrix} \begin{pmatrix} \cos\gamma 3 & -\sin\gamma 3 & 0 \\ \sin\gamma 3 & \cos\gamma 3 & 0 \\ 0 & 0 & 1 \end{pmatrix} \quad (3)$$

It is assumed that points representing the positions of elbow joint 12B, wrist joint 12C and the tip of the index finger are $P_2$, $P_3$ and $P_4$. $P_2$, $P_3$ and $P_4$ can be expressed as follows.

$$P_1 = (-W1, D1, H1)^t \quad (4)$$

$$P_2 = P_1 + [R1]*(0,0,-La)^t \quad (5)$$

$$P_3 = P_2 + [R1]*[R2]*(0,0,-Lb)^t \quad (6)$$

$$P_4 = P_3 + [R1]*[R2]*[R3]*(W4,0,H4)^t \quad (7)$$

When position data $P_{0G}$=(x0, y0, z0) representing the position of humanoid robot 1 and inclination angles ($\alpha 0$, $\beta 0$, $\gamma 0$) of trunk 11A are given, $P_1$ to $P_4$ in the UVW-coordinate system can be converted into $P_{1G}$ to $P_G$ in an XYZ-coordinate system as follows. The XYZ-coordinate system is a coordinate system representing a space in which humanoid robot 1 exists. Hereafter, it is assumed that the rotation matrix representing inclination angles ($\alpha 0$, $\beta 0$, $\gamma 0$) is [R0]. Position data $P_{0G}$ and the inclination angle of trunk 11A are also included in posture data 52. The position of humanoid robot 1 is measured by a Global Positioning System (GPS) device, for example.

[Mathematical Formula 4]

$$[R0] = \begin{pmatrix} 1 & 0 & 0 \\ 0 & \cos\alpha 0 & -\sin\alpha 0 \\ 0 & \sin\alpha 0 & \cos\alpha 0 \end{pmatrix} \begin{pmatrix} \cos\beta 0 & 0 & -\sin\beta 0 \\ 0 & 1 & 0 \\ \sin\beta 0 & 0 & \cos\beta 0 \end{pmatrix} \begin{pmatrix} \cos\gamma 0 & -\sin\gamma 0 & 0 \\ \sin\gamma 0 & \cos\gamma 0 & 0 \\ 0 & 0 & 1 \end{pmatrix} \quad (8)$$

$$P_{0G} = (x0, y0, z0) \quad (9)$$

$$P_{1G} = P_{0G} + [R0]*P_1 \quad (10)$$

$$P_{2G} = P_{0G} + [R0]*P_2 \quad (11)$$

$$P_{3G} = P_{0G} + [R0]*P_3 \quad (12)$$

$$P_{4G} = P_{0G} + [R0]*P_4 \quad (13)$$

Although it is actually more complicated, three-dimensional model 56 of humanoid robot 1 can be generated in the same manner. Data representing the structure of humanoid robot 1 is stored in structural data storage 32 as robot structural data 81. Examples of robot structural data 81 include the connection relationship between skeleton 11 and joint 12, dimensions of skeleton 11, and the rotatable angle of joint 12. Robot structural data 81 is data that does not change when humanoid robot 1 is moved. Model image generator 34 generates three-dimensional model 56 of humanoid robot 1 by substituting posture data 52 representing the changing value of each portion of humanoid robot 1 into the equation determined by robot structural data 81.

Model image generator 34 determines the three-dimensional position and the imaging direction of on-site camera 2 with referring to camera structural data 82 and posture data 52. Because the position of on-site camera 2 relative to trunk 11A is fixed, the three-dimensional position of on-site camera 2 is determined from the three-dimensional position and the direction of trunk 11A in three-dimensional model 56. The imaging direction is determined from the direction in which head 11E faces and the direction of on-site camera 2 relative to head 11E.

Model image generator 34 generates model image 57 from the three-dimensional position and the imaging direction of on-site camera 2. Model image generator 34 generates model image 57 on the assumption that only three-dimensional model 56 of humanoid robot 1 exists on the site. Model image 57 is an image in which three-dimensional model 56 is viewed from the three-dimensional position and the imaging direction of on-site camera 2. In model image 57, a range of pixels in which three-dimensional model 56 is displayed is referred to as a manipulator image 59. In model image 57, the portion that is not included in manipulator image 59 is transparent. Model image generator 34 generates three-dimensional model 56 and model image 57 with referring to robot structural data 81 and posture data 52. Model image generator 34 is also a three-dimensional model generator that generates three-dimensional model 56. The three-dimensional model generator may be provided separately from model image generator.

Figure 5:
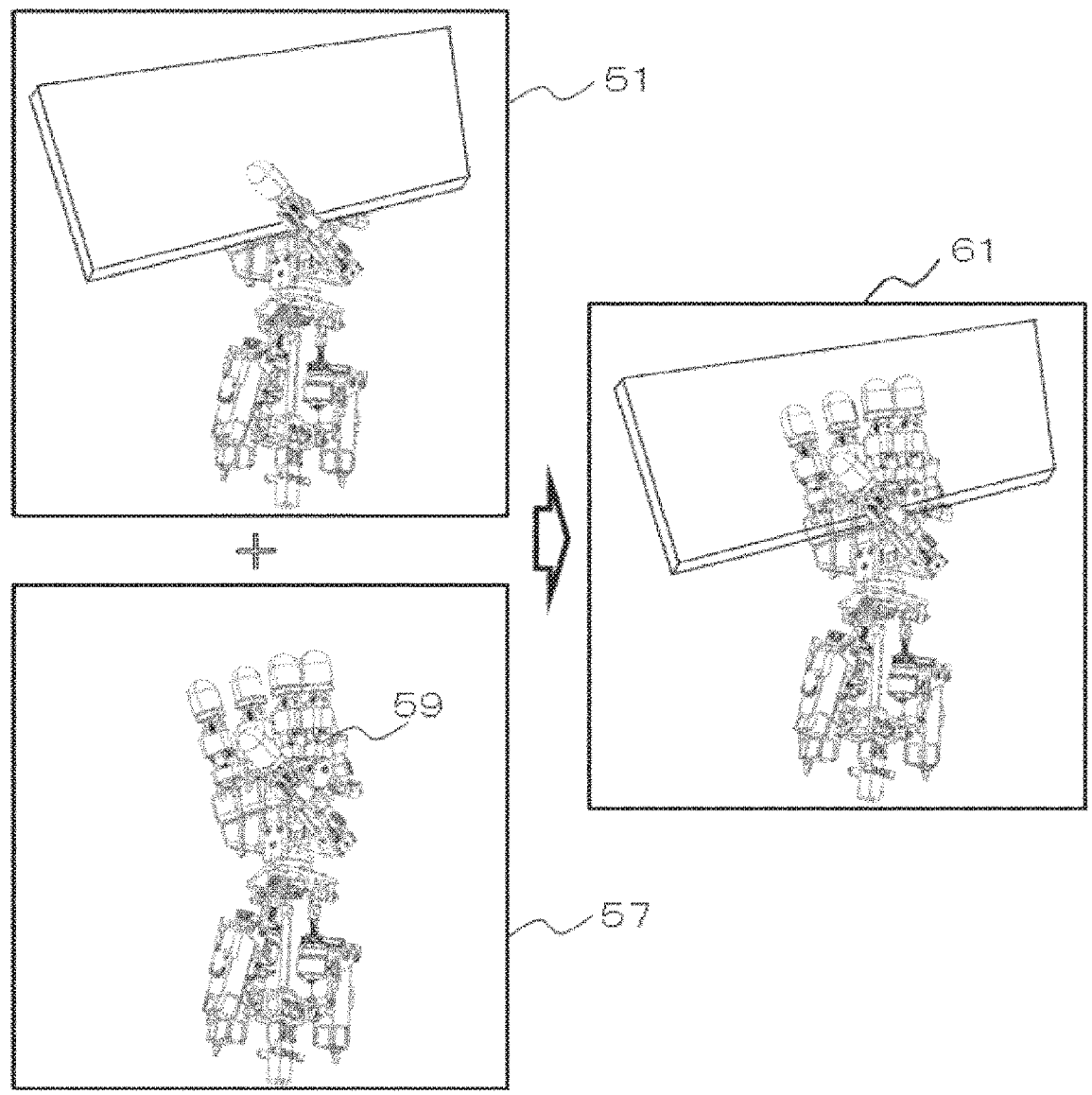
FIG. 5 is a view illustrating an example of a first half of processing of generating a presentation image presented to an operator by the remote control manipulator system of the first embodiment.

FIG. 5 illustrates an example of model image 57. FIG. 5 is an image when hand 11D holds plate-shaped object 20. Fingers other than a thumb are located behind object 20, and cannot be captured in captured image 51. Model image 57 in FIG. 5 is a virtual image in which hand 11D of humanoid robot 1 is viewed from the position of on-site camera 2 on the assumption that object 20 does not exist.

Tactile data 53 is inputted to tactile image generator 35, and tactile image generator 35 generates tactile image 58 with referring to tactile sensor structural data 83 and tactile data 53. Tactile data 53 is data indicating that tactile sensor 7 is in contact with object 20. Tactile image 58 is an image that is displayed by including a contact symbol 60 representing tactile sensor 7 that detects contact. Contact symbol 60 is displayed at a display position of contact symbol 60 for each tactile sensor 7 determined from the data stored in tactile sensor structural data 83 in a display mode that is changed depending on the magnitude of the contact force. The display position of contact symbol 60 may be a determined position in the tactile image. When contact symbol 60 is displayed at the position where corresponding tactile sensor 7 exists, the display position of contact symbol 60 in tactile sensor structural data 83 is defined by the position relative to humanoid robot 1. In this case, the display position of contact symbol 60 is determined using posture data 52. In tactile image 58, the pixel of contact symbol 60 has transmittance of about 50%. The pixels except for contact symbol 60 are transparent, namely, the transmittance is 100%.

Figure 6:
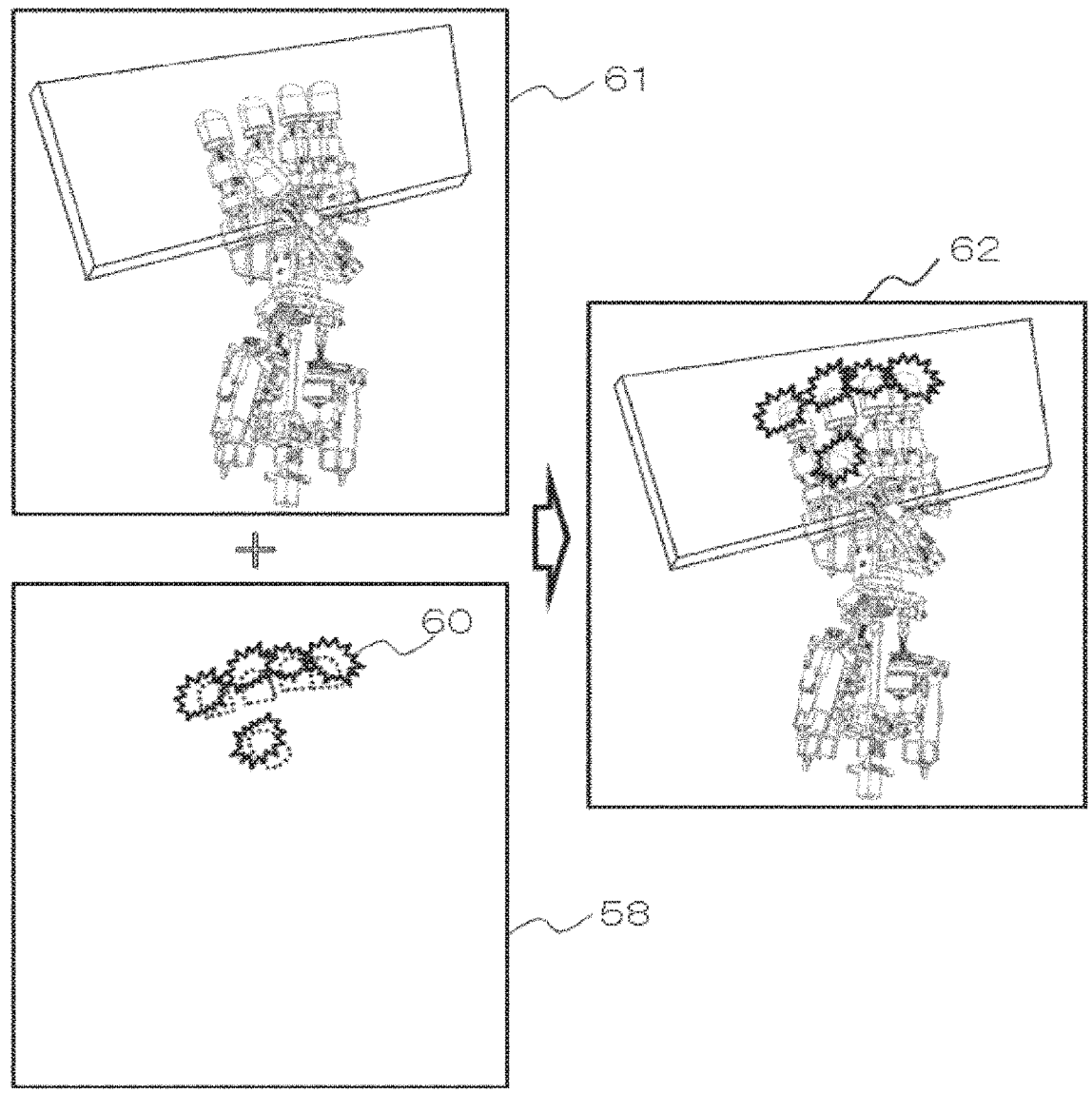
FIG. 6 is a view illustrating an example of a second half of the processing of generating the presentation image presented to the operator by the remote control manipulator system of the first embodiment.

FIG. 6 illustrates an example of tactile image 58. In FIG. 6, although the fingertips are indicated by a dotted line, the fingertips are drawn to indicate the display position of contact symbol 60. In actual tactile image 58, the dotted fingertip is not drawn. Contact symbol 60 is also displayed outside the fingertip such that the fingertip contacting with object 20 can be recognized easily. Contact symbol 60 may be displayed by only changing color of the fingertip. For the large contact force, contact symbol 60 is displayed in a dark color. For the small contact force, contact symbol 60 is displayed in a light color. In addition to the change of the display form of contact symbol 60 depending on the contact force, or without changing the display form, contact symbol 60 may be blinked, and the magnitude of the contact force may be expressed by a blinking speed. A blinking interval is shortened for the large contact force, and the blinking interval is lengthened for the small contact force. A blinking period may be the same, and time for which contact symbol 60 is displayed may be lengthened for the large contact force. Both the blinking period and a ratio of the time for which the contact symbol is displayed in one period may be changed depending on the contact force.

By displaying contact symbol 60, the contact of the manipulator with the object can be presented to operator 30 even when the object that is the operation target is a hard object and difficult to be deformed. For a soft object, a deformation amount of the object is large, and it is easy to understand visually that the manipulator contacts with the object without displaying the contact symbol. On the other hand, for a hard object, the deformation amount of the object is small, and it is difficult for operator 30 to determine whether or not the manipulator contacts with the object unless the contact symbol is displayed.

Presentation image generator 36 generates presentation image 50 by superimposing model image 57 and tactile image 58 on captured image 51. Presentation image 50 is an image that is presented to operator 30 such that operator 30 can grasp the state of humanoid robot 1. FIGS. 5 and 6 are views illustrating an example of processing of generating the presentation image presented to the operator by the remote control manipulator system of the first embodiment. FIG. 5 illustrates a first half of the processing, and FIG. 6 illustrates a second half of the processing. When model image 57 is superimposed on captured image 51, model image 57 is set to a front-side layer. In the pixel of the portion where it can be determined that humanoid robot 1 is captured in captured image 51, captured image 51 is displayed instead of model image 57. The pixel in which manipulator image 59 exists in model image 57 may be displayed so as to have constant transmittance, and captured image 51 may also be displayed on the pixel. Model image 57 and captured image 51 are superimposed such that manipulator image 59 is displayed in preference to captured image 51. Captured image 51 may be displayed in a front-side layer, and in the pixel of the portion where humanoid robot 1 is not captured in captured image 51 and manipulator image 59 is displayed in the corresponding pixel in model image 57, captured image 51 may be displayed with a transmittance of greater than or equal to 50%. Captured image 51 may be displayed so as to be transmitted through in the entire region of captured image 51. Model image 57 and captured image 51 may be superimposed by any method as long as the method can generate presentation image 50 in which manipulator image 59 is displayed in the pixels where humanoid robot 1 is not captured in captured image 51 and manipulator image 59 is displayed in model image 57. An image obtained by superimposing model image 57 on captured image 51 is referred to as a model display captured image 61.

Presentation image generator 36 further superimposes tactile image 58 on the front-side layer of model display captured image 61 to generate a tactile display captured image 62. In tactile image 58, a portion that is not an image displaying tactile sense is transparent, and model display captured image 61 is displayed in the portion. In the drawing, an outline of hand 11D is indicated by a dotted line in tactile image 58. The outline of hand 11D is illustrated in the drawing to show that the outline of hand 11D can properly be aligned with model image 51, and is not displayed in the actual image. Presentation image generator 36 may generate tactile display captured image 62 by superimposing the image obtained by superimposing model image 57 and tactile image 58 on captured image 51.

Presentation image generator 36 stores tactile display captured image 62 as presentation image 50 in state data storage 33. Head mount display 4 displays presentation image 50.

Operator 30 performs the action intended to be performed by humanoid robot 1 and the action is read from the captured image in which the action performed by operator 30 is captured, thereby generating the action instruction to humanoid robot 1. The action performed by operator 30 is captured by instruction reading cameras 6A, 6B. The place where the operator 30 performs the action is determined in advance in the command center. Instruction reading cameras 6A, 6B are disposed such that the object existing in the determined place can be captured with an appropriate angle difference. The images captured simultaneously by instruction reading cameras 6A, 6B are referred to as action instruction input images 63A, 63B. The number of instruction reading cameras may be one or three or more.

The place where operator 30 performs the action to input the action instruction, installation positions and the imaging directions of instruction reading cameras 6A, 6B, and the like are stored in structural data storage 32 as reading camera structural data 84.

The length of the upper arm of operator 30, the length of the forearm, the distances between multiple feature points representing the shape of the palm, the length of each finger, and the like are stored in structural data storage 32 as operator physique data 85. The feature point means a point, such as the shoulder joint, the elbow joint, the wrist joint, and the fingertip, that can be used to grasp the posture of operator 30 from the image. In order to facilitate the image recognition of the feature point, operator 30 may attach a mark to the position of the feature point of operator 30.

Action instruction data generator 37 includes a feature point extractor 39, an image constraint condition generator 40, a posture determiner 41, and an instruction data converter 42. Feature point extractor 39 performs image processing on action instruction input images 63A, 63B, and reads a pixel position where a feature point such as a joint position on the body of operator 30 is displayed. Instruction reading cameras 6A, 6B and action instruction data generator 37 constitute an action instruction inputter with which operator 30 inputs the action instruction instructing the action to move and stop humanoid robot 1.

The pixel position of the feature point read from action instruction input image 63A means that the feature point exists on a straight line in the three-dimensional space passing through the installation position of instruction reading camera 6A and having the direction corresponding to the pixel position. The same applies to action instruction input image 63B. The pixel position of the feature point read from action instruction input image 63B means that the feature point exists on a straight line in the three-dimensional space passing through the installation position of instruction reading camera 6B and having the direction corresponding to the pixel position. Image constraint condition generator 40 extracts a straight line on which the feature point extracted by feature point extractor 39 exists. The fact that a feature point exists on a straight line is a constraint condition (image constraint condition) regarding the position where the feature point exists. For example, the center pixel of the image corresponds to the straight line extending in the imaging direction. The pixels at the center in the up-down direction and at both ends in the right-left direction are the straight lines each extending in a direction inclined in the right-left direction by a half of the viewing angle with respect to the imaging direction.

Posture determiner 41 determines operator posture data 64 that is the three-dimensional position of the feature point representing the posture of operator 30 captured as action instruction input images 63A, 63B. Posture determiner 41 determines operator posture data 64 by minimizing an evaluation function such as the sum of squares of the error amount of the image constraint condition, while satisfying the constraint condition (physique constraint condition) determined by operator physique data 85. The weighted sum of squares of the error amount of the physique constraint condition and the image constraint condition may be minimized as the evaluation function to determine operator posture data 64. A weighted sum of squares may be used when the sum of squares is taken only by the error amount of the image constraint condition.

Instruction data converter 42 converts operator posture data 64 represented by the three-dimensional position of the feature point into action instruction data 54 represented by the rotation angle of each joint of humanoid robot 1. Action instruction data 54 is expressed in the same manner as posture data 52. In this way, action instruction data generator 37 generates action instruction data 54 from action instruction input images 63A, 63B at each point of time. Action instruction data 54 is obtained as a time series of action instruction data 54 generated from action instruction input images 63A, 63B in order of an imaging times each at which an image is captured.

Control signal generator 38 generates a control signal including action instruction data 54, and sends the control signal to humanoid robot 1. Humanoid robot 1 changes its posture according to action instruction data 54 extracted from the control signal.

Figure 7:
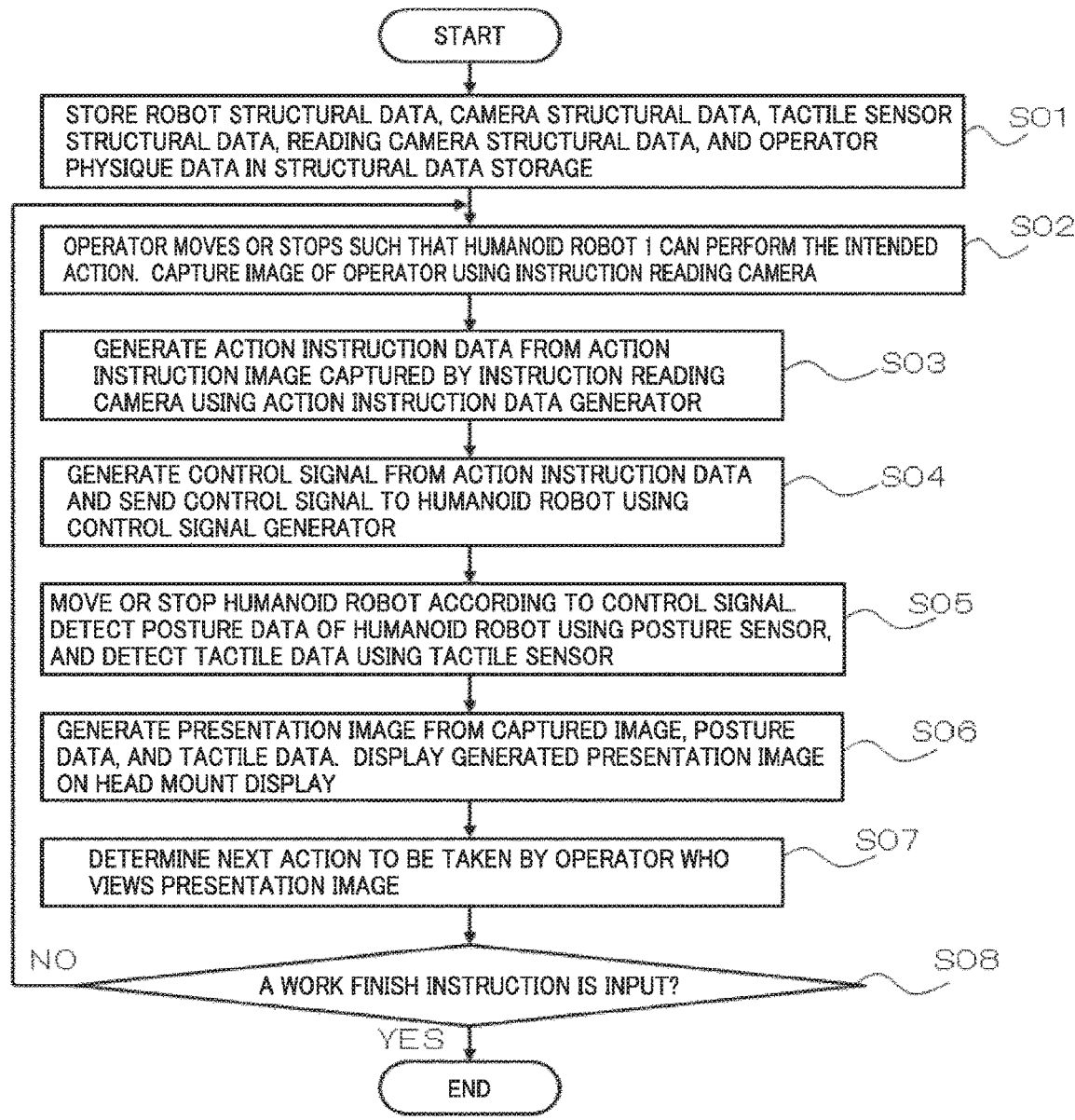
FIG. 7 is a flowchart illustrating a procedure for controlling the humanoid robot remotely using the remote control manipulator system of the first embodiment.

An operation is described. FIG. 7 is a flowchart illustrating a procedure for controlling the humanoid robot remotely using the remote control manipulator system of the first embodiment.

In step S01, robot structural data 81, camera structural data 82, tactile sensor structural data 83, reading camera structural data 84, and operator physique data 85 are stored in structural data storage 32.

In step S02, operator 30 moves or stops such that humanoid robot 1 can perform the intended action. Operator 30 may move and then stops, or stops and then moves.

Instruction reading cameras 6A, 6B capture the images of operator 30.

In step S03, action instruction data generator 37 generates action instruction data 54 from action instruction input images 63A, 63B captured by instruction reading cameras 6A, 6B.

In step S04, control signal generator 38 generates the control signal from action instruction data 54, and sends the control signal to humanoid robot 1.

In step S05, humanoid robot 1 that receives the control signal is moved or stopped according to action instruction data 54 included in the control signal. When humanoid robot 1 cannot perform the action as instructed by action instruction data 54, humanoid robot 1 moves similarly to the instructed action as much as possible.

Posture sensor 9 detects posture data 52 of humanoid robot 1, and tactile sensor 7 detects tactile data 53. Posture data 52, tactile data 53, captured image 51 captured by on-site camera 2, and imaging condition data 55 are sent to control device 3. When imaging condition data 55 is always the same, imaging condition data 55 is stored in structural data storage 32 of control device 3, and may not be sent from humanoid robot 1 to control device 3.

In step S06, tactile display captured image 62 is generated from captured image 51 captured by on-site camera 2, posture data 52, and tactile data 53. More particularly, model image generator 34 generates model image 57 using posture data 52. Tactile image generator 35 generates tactile image 58 using tactile data 53. Presentation image generator 50 generates tactile display captured image 62 by superimposing model image 57 and tactile image 58 on captured image 51. Tactile display captured image 62 is displayed on head mount display 4 as presentation image 50.

In step S07, operator 30 who views presentation image 50 determines the next action to be performed. Alternatively, operator 30 inputs an instruction to finish the work.

In step S08, whether or not operator 30 inputs a work finish instruction is checked. When operator 30 inputs the work finish instruction (YES in S08), the processing is finished. When operator 30 does not input the work finish instruction (NO in S08), the processing returns to step S02. Steps S02 to 07 are periodically repeated.

Tactile data 53 detected by the tactile sensor 7 is also presented to operator 30 by displaying in presentation image 50. In a brain of operator 30, because tactile information consistent with visual information is reconstructed, the state of humanoid robot 1 including a tactile sense is recognized with a sense of unity, and humanoid robot 1 can be controlled remotely.

Figure 8:
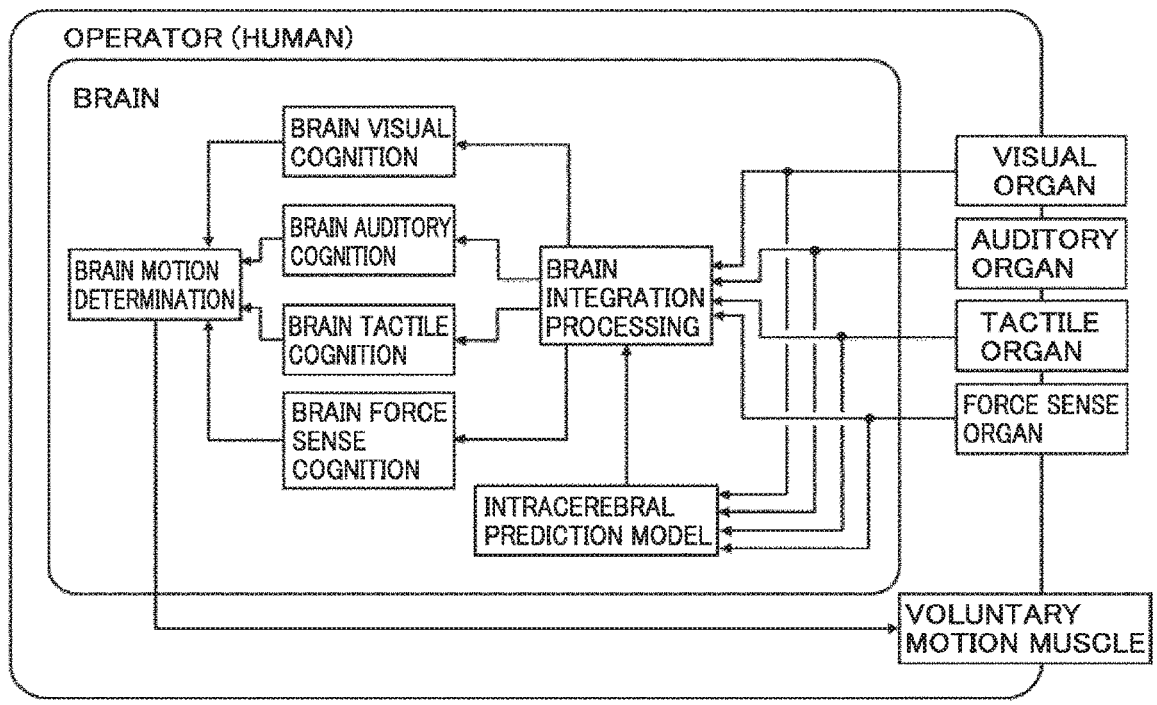
FIG. 8 is a configuration diagram illustrating a model of a human motion perception system.

As a reference, FIG. 8 illustrates a configuration diagram of a model of a general human motion perception system. Multiple pieces of sensory organ information are recognized as various kinds of cognitive information used for motion determination by combining the multiple pieces of sensory organ information and output of an intracerebral prediction model. The sensory organ information is inputted from sensory organs such as a visual organ, an auditory organ, a tactile organ, and a force sense organ. The intracerebral prediction model is constructed from learning data accumulated in the brain. The cognitive information is recognized for each sensory organ. Examples of the cognitive information include visual cognitive information, auditory cognitive information, tactile cognitive information, and force sense cognitive information. The force sense means a feeling that muscles are exerting power. Based on the visual recognition information, the auditory recognition information, the tactile recognition information, and the force sense recognition information, a human determines what kind of movement is required in the brain, and drives each muscle of the body based on the determination.

Figure 9:
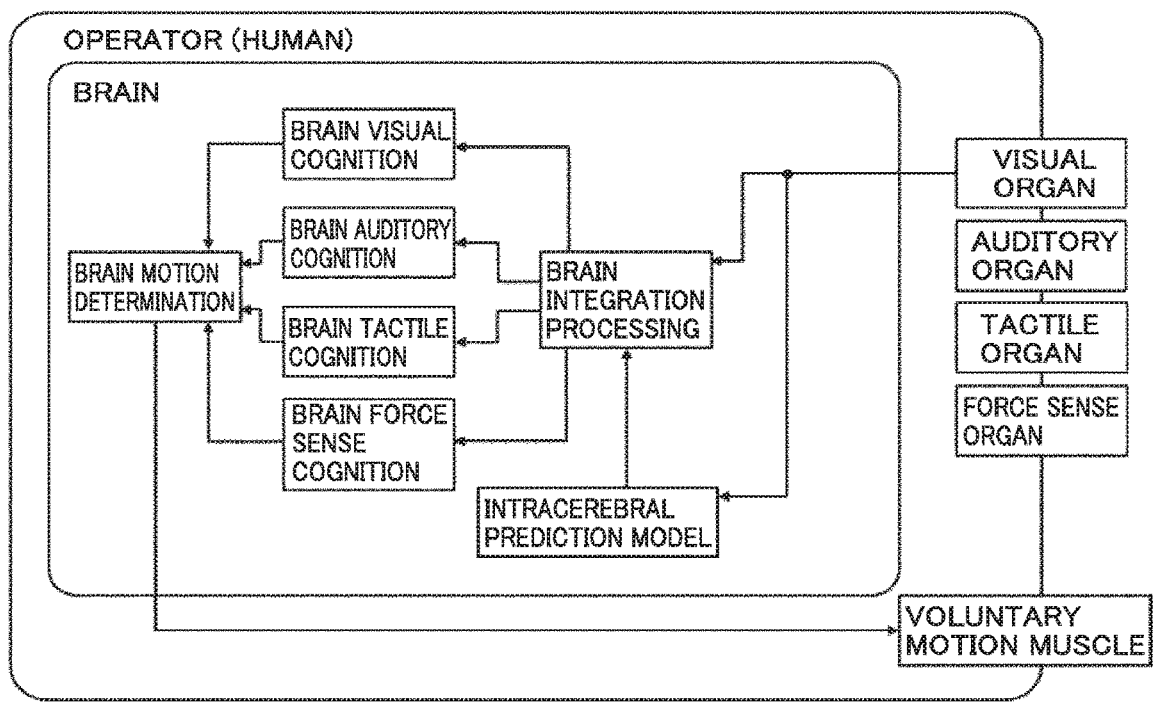
FIG. 9 is a view illustrating a flow of information in the model of the human motion perception system when the humanoid robot is controlled remotely by the remote control manipulator system of the first embodiment.

FIG. 9 is a view illustrating a flow of information in the model of the human motion perception system when the humanoid robot is controlled remotely by the remote control manipulator system of the first embodiment. Only the visual information and the output of the intracerebral prediction model constructed only from the visual information are inputted to brain integration processing. For this reason, the brain prediction model regarding the tactile information or the force sense information is not generated, and a timing difference is not generated between the intracerebral prediction model and the actual tactile information and force sense information. When the operator receives the tactile information or the force sense information, the brain prediction model regarding the tactile information or the force sense information is generated.

The tactile information detected by the manipulator (remote control manipulator) installed at a separated place is superimposed on the visual information, and presented to the operator (human). Because the operator reconstructs the intracerebral prediction model from the visual information, inconsistency is not generated between the visual information and the tactile sense obtained in a pseudo manner, and a rational operational feeling can be obtained for the sensory organ of the operator.

When the remote control manipulator includes a force sensor, the force sense information detected by the force sensor and expressed visually is presented to the operator as the visual information. Consequently, the inconsistency is eliminated between the visual information and the force sense information.

When the remote control manipulator system includes a tactile presentation device that presents the tactile information to the operator, there is a possibility of inputting the visual information and the tactile information at different timings. When the visual information and the tactile information are presented to the operator at different timings, the operator may feel uncomfortable in operating the manipulator. For example, when the visual information is presented earlier, the visual information causes the intracerebral prediction model to predict timing at which the tactile sense is generated. When the tactile information is presented from the tactile sense presentation device in timing different from the predicted timing, it is considered that the operator feels uncomfortable.

The remote construction machine or Da Vinci being a surgery support robot that is the remote control manipulator system including a tactile sense presentation device and a force sense presentation device is said to operate while the tactile sense presentation device and the force sense presentation device are turned off. The reason why the tactile sense presentation device and the force sense presentation device are turned off is that, as described above, the operator feels uncomfortable when the tactile information is presented from the tactile sense presentation device in timing different from the predicted timing.

In the remote control manipulator system of the present disclosure, operator 30 grasps the state of the manipulator visually, and controls the manipulator as needed. For this reason, the structure on the manipulator side is simplified. Using flexible ability for situation determination and higher-order learning ability of a human, a system having simple configuration can ensure stability and reliability of the entire system. It is considered that the stability and the reliability of the system is still difficult to be secured in the system in which the manipulator that handles the object controls autonomously using the outputs of the automatic recognition camera, the tactile sensor, the force sensor, and the like.

As to the visual information, as illustrated in FIGS. 5 and 6, hand 11D of humanoid robot 1 is displayed as model image 57 even in the portion hidden behind object 20. For this reason, operator 30 can grasp the situation of hand 11D correctly, and the operation accuracy is improved.

As illustrated in FIG. 6, when the fingertip of hand 11D contacts with object 20, contact symbol 60 is displayed at the contact point. Contact symbol 60 is displayed, so that the operator can understand easily and correctly that the fingertip of hand 11D contacts with object 20. The model image may simply be superimposed on the captured image without displaying the contact symbol. Even in this case, operator 30 can grasp the state of humanoid robot 1 correctly, and control humanoid robot 1 remotely and more easily than before.

The information is presented to the operator mainly by the visual information. The tactile presentation device that presents the tactile data detected by the tactile sensor to the operator becomes unnecessary. The force sense presentation device that causes the operator to feel the force generated by the manipulator detected by the force sensor also becomes unnecessary. That is, the system configuration is simplified.

The present disclosure can be applied to not only the humanoid robot but also a robot with only an upper body, a one-arm robot arm, a robot hand, and the like. The present disclosure can be applied to any machine or devices that handles the object. The machine or device that handles the objects is called a manipulator. The object includes a tool held by the manipulator, the object processed by the tool, the object that is operated without using the tool, and the like. Examples of the tool include a hand tool such as a screwdriver and a plier, a cutter such as a kitchen knife and a scalpel, stationery such as scissors, a ruler, and a writing tool, a carpenter tool, a cleaning tool, an information device such as a personal computer, a door or a window of the building, and a hand cart that carries luggage, and a wheelchair and a mobile bed that move a person. The object may be liquid, solid, or gas. The object includes a human, an animal, and a plant.

According to the remote control manipulator system of the present disclosure, work operation performance of the remote control manipulator is improved. Using a remote control robot or manipulator, hard work such as work in a dangerous environment or a harsh or uncomfortable environment for a human and an operation to treat a heavy object for a human can be performed while a load on the human is reduced. The remote control robot or manipulator can be used to support a worker involved in a disaster response and in an industrial field in which there exists a labor shortage. The remote control robot or manipulator can also be used to support nursing care by the robots in an aging society.

It is assumed that using the manipulator remote control system, a gripping operation is performed by the remote work machine or the hand of the robot while viewing a video from a remote location during a disaster relief or at a factory of general industry or a construction site. However, in the actual operation, it is difficult to learn or to make models of an environment and a gripping object in advance. In a vision-based operation system of the remote control manipulator of the present disclosure, the operator can recognize an ambient environment and a work situation from vision-base information, and the operation reliability of the remote control manipulator can be expected to be improved.

As a system that reads the action instruction, a system other than a system in which the operation of the operator is captured by the camera and the action instruction is read from the captured image can be used. For example, the action instruction input device in which a sensor that reads the motion of the operator or a tension degree of the muscle is attached to the body of the operator may be used. The action instruction may be inputted using a control stick, a steering wheel (handle), a lever, a joystick, a button, a knob, a pedal, or the like. Any action instruction inputter may be used as long as the action in which the manipulator is moved or stopped can be inputted.

The above is also applied to other embodiments.

Second Embodiment

Figure 10:
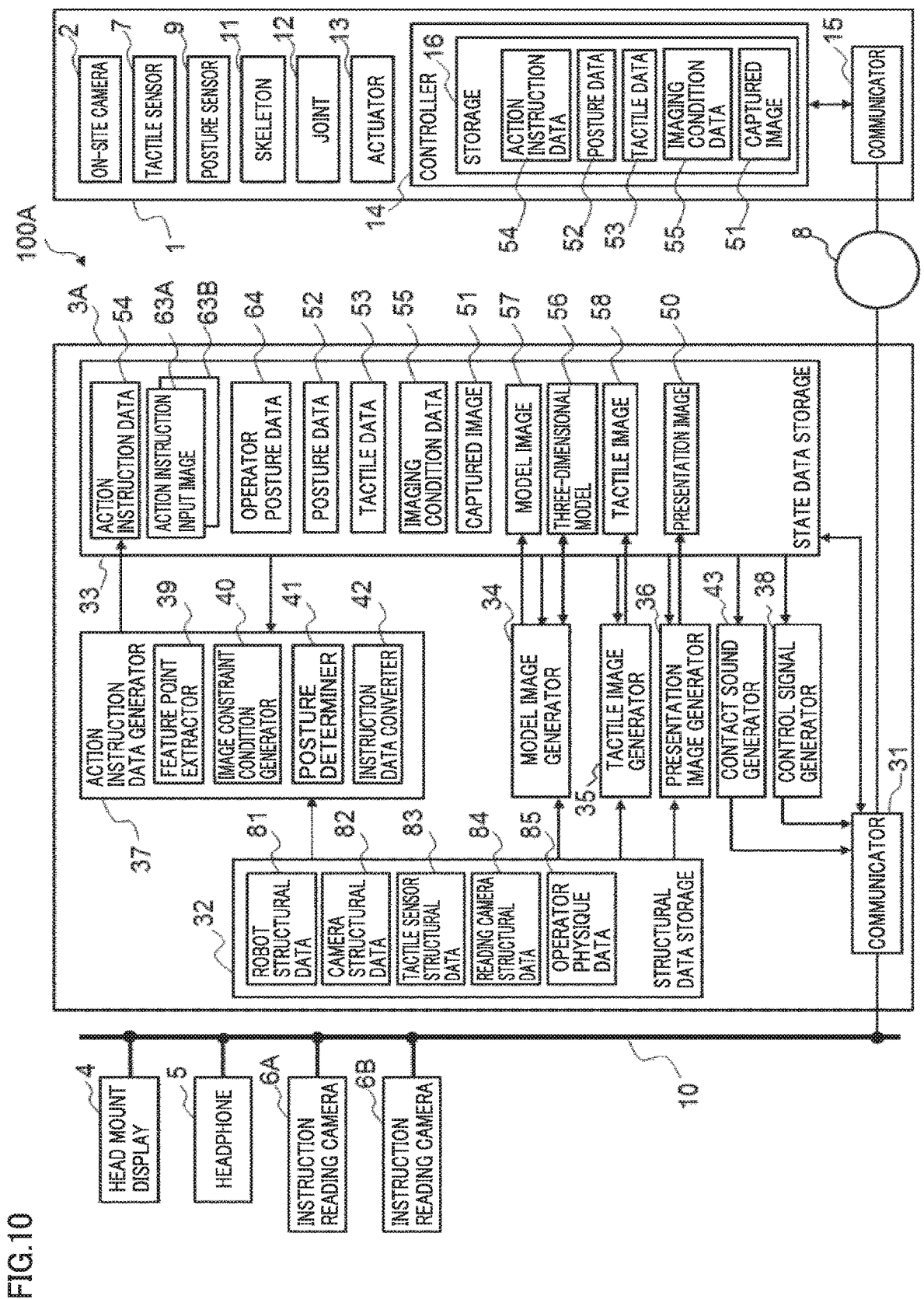
FIG. 10 is a block diagram illustrating a functional configuration of a remote control manipulator system according to a second embodiment of the present disclosure.

A second embodiment is the case where the first embodiment is modified so as to notify an operator of the contact by sound in addition to the contact symbol. In the second embodiment, when the state in which the contact symbol is not displayed is changed to the state in which the contact symbol is displayed, or when the display of the contact symbol is changed, a contact sound is generated for a predetermined time. FIG. 10 is a block diagram illustrating a functional configuration of a remote control manipulator system according to the second embodiment of the present disclosure. Points different from those in FIG. 3 of the first embodiment are described.

A control device 3A constituting a remote control manipulator system 100A includes a contact sound generator 43. Tactile data 53 inputted at the previous cycle is stored such that contact sound generator 43 can refer to tactile data 53 inputted at the previous cycle. Contact sound generator 43 checks whether or not the difference between tactile data 53 inputted at this cycle and tactile data 53 inputted at the previous cycle satisfies a determined condition. When the determined condition is satisfied, contact sound generator 43 generates the contact sound indicating that tactile data 53 is changed. Headphones 5 output the contact sound in addition to the sound inputted from the microphone of on-site camera 2. Contact sound generator 43 is a sound controller that controls the headphones 5 according to the tactile data to generate the sound.

The predetermined condition that generates the contact sound (referred to as a contact sound output condition) is, for example, the case where existence of tactile sensor 7 in the contact state is detected when all tactile sensors 7 are in the non-contact state. When multiple tactile sensors 7 are mounted on one finger, a contact sound output condition may be the case where the existence of tactile sensor 7 in the contact state is detected in the multiple tactile sensors 7 for fingers before all tactile sensors 7 are in the non-contact state. When the contact is continued, the contact sound may be outputted continuously.

Figure 11:
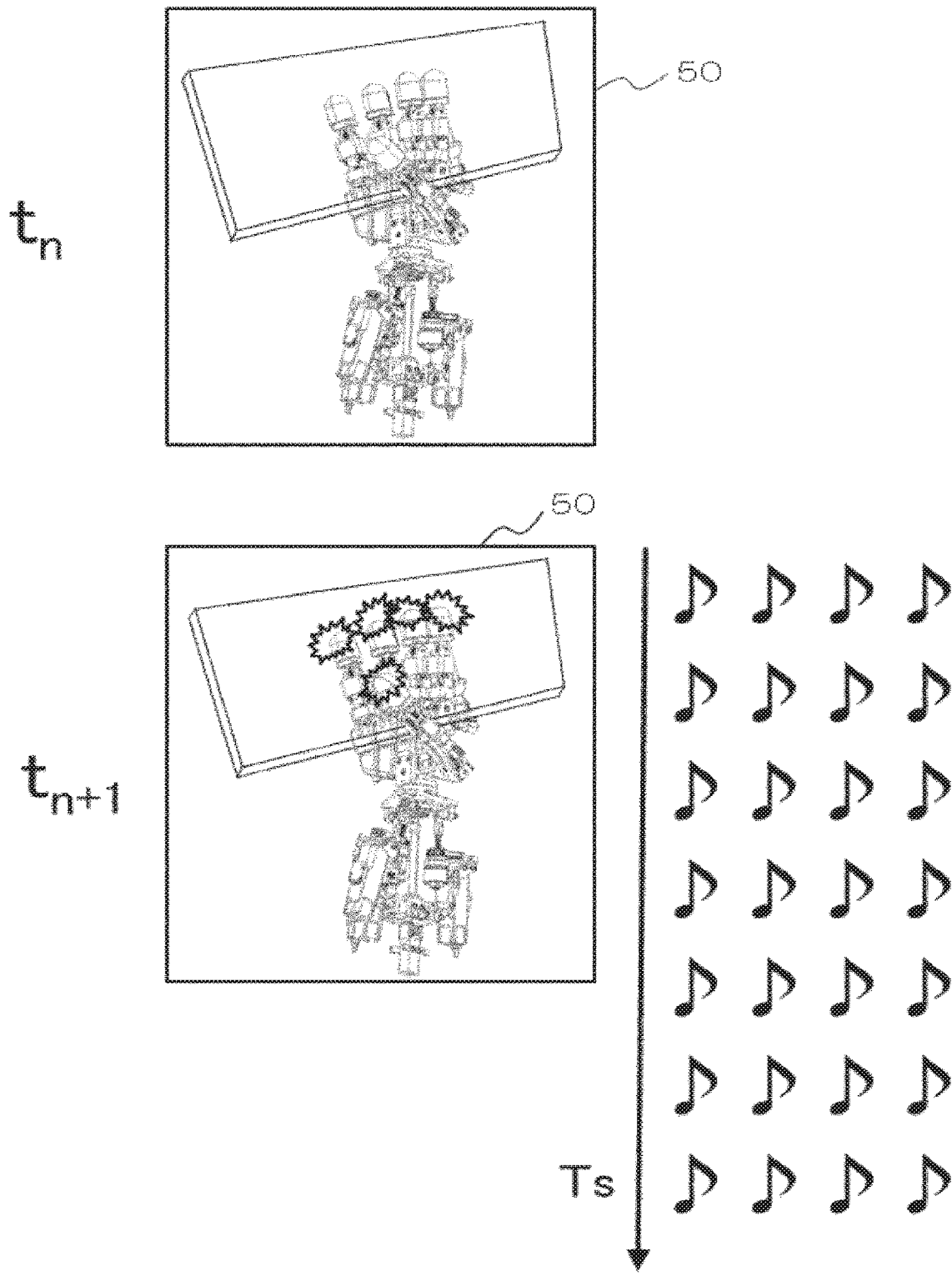
FIG. 11 is a view illustrating an example of a method for notifying an operator by sound of a change in tactile data together with a presentation image in the remote control manipulator system of the second embodiment.

A method for presenting presentation image 50 with the contact sound is described. FIG. 11 is a view illustrating an example of a method for notifying the operator by sound of the change in tactile data together with the presentation image in the remote control manipulator system of the second embodiment. An upper side of FIG. 11 is a display example of presentation image 50 when all tactile data 53 are in the non-contact state at a point of time tn. A lower side of FIG. 11 is a display example of presentation image 50 when tactile data 53 in the contact state exists at a point of time tn+1. Contact symbol 60 is displayed on the contact portion, and the contact sound is outputted to headphones 5. The output of the contact sound to headphones 5 is represented by a musical note (♪) in FIG. 11. A length of a period (Ts) during which the contact sound is outputted may be set to an appropriate time for human recognition, and may be set longer than a cycle in which presentation image 50 is updated.

The contact sound may be changed depending on the magnitude of the contact force. For example, the loud sound is outputted for the large contact force, and the small sound is outputted for the small contact force. Sound quality may also be changed depending on a physical property (rigidity) of the operation target. For example, a high-frequency percussion sound can be considered for a hard object, and a low-frequency percussion sound can be considered for a soft object. Sound produced by a musical instrument (such as a whistle or a stringed instrument) may be used instead of the percussion sound. An intermittent sound may be used to change the interval between the sounds or the length of the continuous sound.

Figure 12:
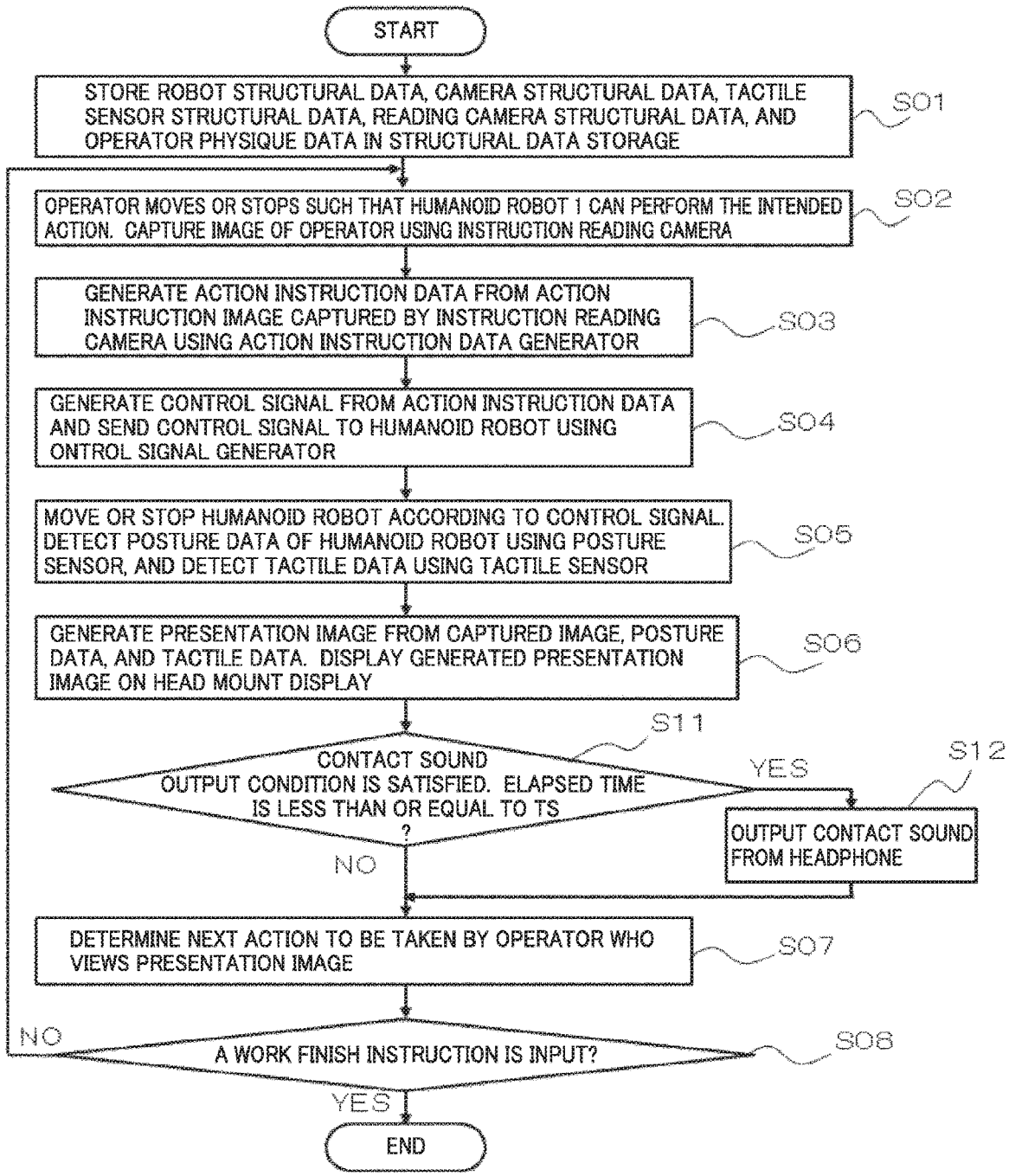
FIG. 12 is a flowchart illustrating a procedure for controlling a humanoid robot remotely using the remote control manipulator system of the second embodiment.

The operation is described. FIG. 12 is a flowchart illustrating a procedure for controlling the humanoid robot remotely using the remote control manipulator system of the second embodiment. Points different from those in FIG. 7 of the first embodiment are described.

Steps S11 and S12 are added between steps S06 and S07. In S06, the presentation image is presented to the operator. In step S11, whether or not tactile data 53 satisfies a contact sound output condition and whether or not the elapsed time since the satisfaction is less than or equal to Ts are checked. When the contact sound output condition is satisfied and the elapsed time is less than or equal to Ts (YES in S11), the contact sound is outputted from headphones 5 in step S12. When the contact sound output condition is not satisfied or when Ts elapses since the contact sound output condition is satisfied (NO in S11), the processing proceeds to step S07. In step S07, the operator judges the presentation image and the contact sound.

The tactile information can be reconstructed more effectively by presenting the tactile information as the sound to the operator. The auditory sense has the following two characteristics.

(A) An auditory response speed of the human is the fastest among the sensory organs.

(B) A data volume of audio information is small than a data amount of visual information, and a time delay causes small influence.

Because the auditory sense has the above characteristics, it is effective to notify the operator of the tactile information using the sound. By notifying the operator by the sound, the operator can recognize more correctly and more easily that the humanoid robot contacts with the object as compared with the case where the operator is notified of the tactile information only by the visual information.

Third Embodiment

Figure 13:
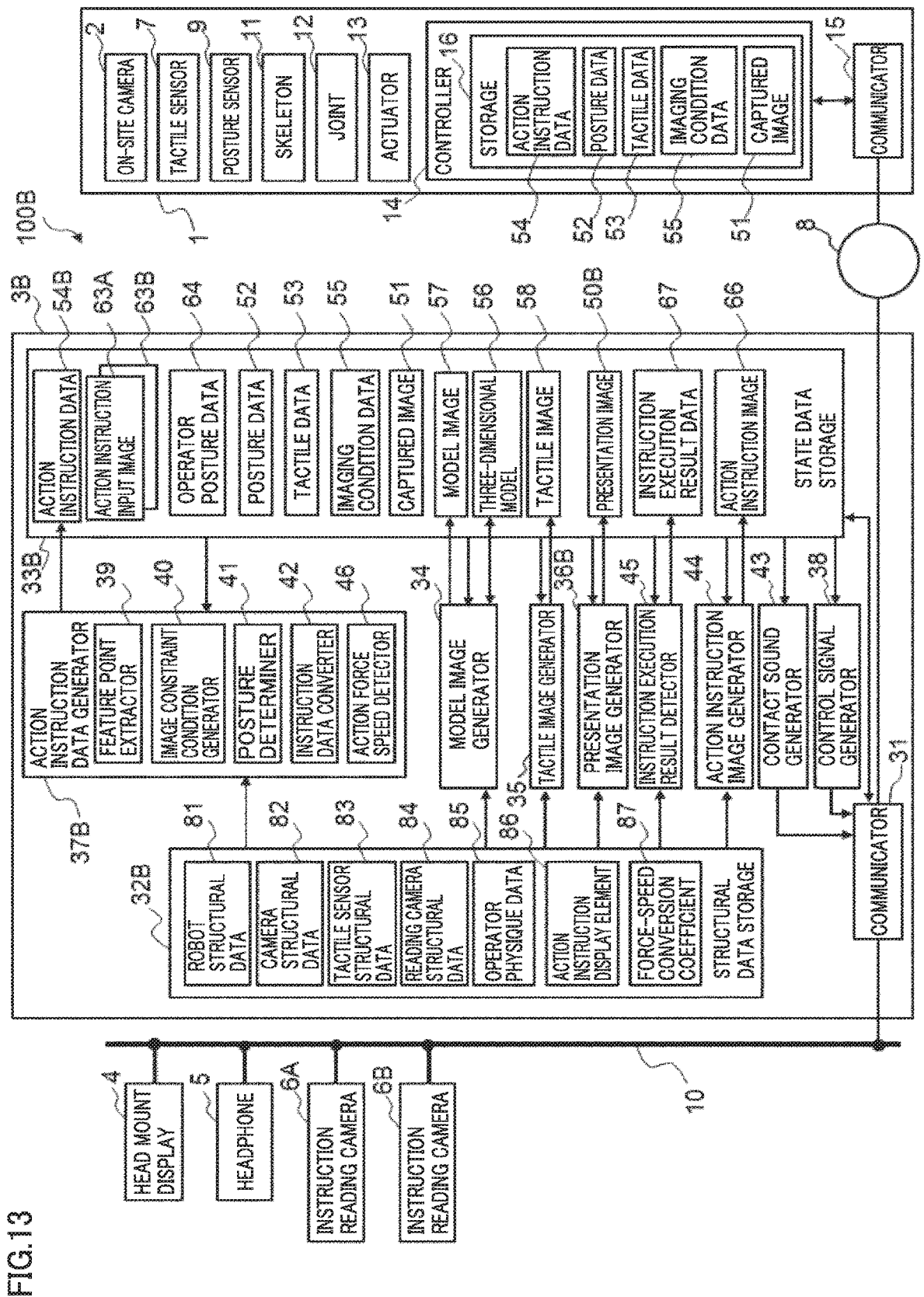
FIG. 13 is a block diagram illustrating a functional configuration of a remote control manipulator system according to a third embodiment of the present disclosure.

A third embodiment is the case where the second embodiment is modified such that the action instruction from the operator is also displayed in the presentation image. By displaying an image representing the action instruction in the presentation image, the operator can determine whether or not the motion of the humanoid robot is performed according to the action instruction, and determine whether or not the action instruction is appropriate. The operator judges that the action instruction is appropriate when the motion of the humanoid robot is performed according to the action instruction, and the action instruction is inappropriate when the motion of the humanoid robot is different from the action instruction. FIG. 13 is a block diagram illustrating a functional configuration of a remote control manipulator system according to the third embodiment of the present disclosure. Points different from those in FIG. 10 of the second embodiment are described.

A control device 3B constituting a remote control manipulator system 100B includes an action instruction image generator 44 and an instruction execution result detector 45. A structural data storage 32B, a state data storage 33B, an action instruction data generator 37B, and a presentation image generator 36B are modified.

Action instruction data 54B is modified from action instruction data 54 so as to include a maximum value (instruction action force) of the force (action force) generated by the action and the action speed (instruction speed). Action instruction data generator 37B generates action instruction data 54B.

Figure 14:
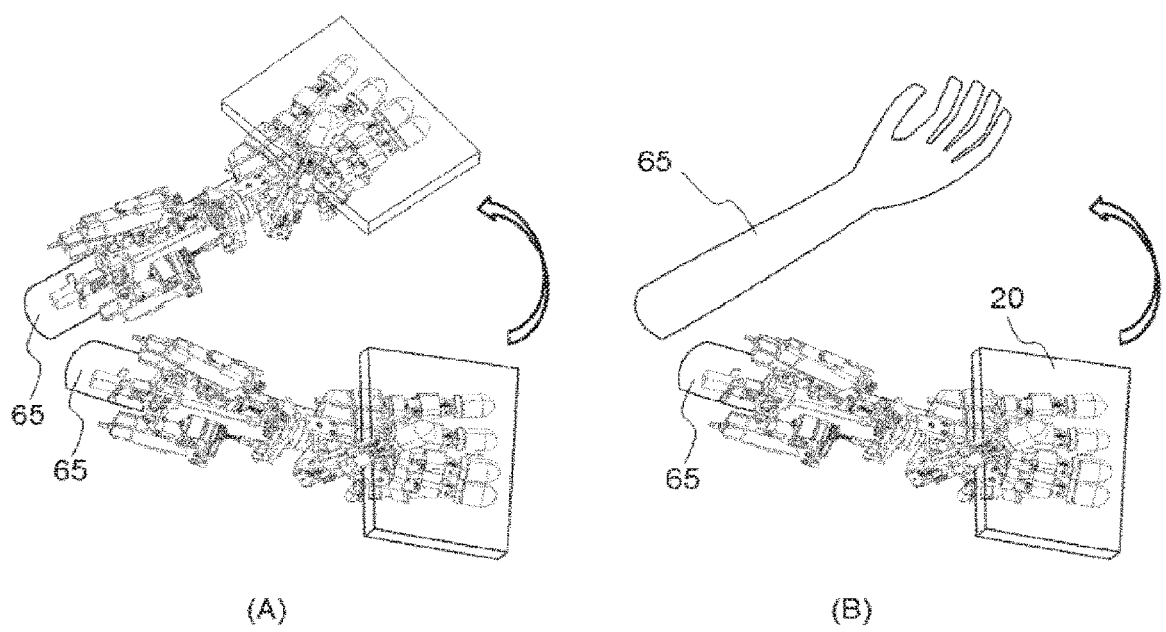
FIG. 14 is a view illustrating an example of a presentation image including an action instruction icon generated by the remote control manipulator system of the third embodiment.

Action instruction image generator 44 generates an action instruction image 66. Action instruction image 66 is displayed in a layer on the back side of model image 57 and on the front side of captured image 51. Action instruction image 66 includes an action instruction icon 65 displaying, like an animation image, the action content instructed by action instruction data 54B. Action instruction icon 65 is an icon (picture symbol) representing the action following the action instruction. Action instruction icon 65 is an icon that combines action instruction display elements 86 that are display elements in which the upper arm, the forearm, the hand, and the like of operator 30 are modeled. For example, FIG. 14 illustrates action instruction icon 65 when hand 11D moves, while holding object 20. FIG. 14 is a view illustrating an example of the presentation image including the action instruction icon generated by the remote control manipulator system of the third embodiment. In FIG. 14(B), action instruction icon 65 in which action instruction display elements 86 of the forearm and the hand are combined is displayed at a position different from manipulator image 59. By displaying action instruction icon 65 at the position different from humanoid robot 1, operator 30 is informed that humanoid robot 1 cannot execute the operation instructed by action instruction data 54B.

Action instruction display element 86 is a display element having unchanged shape and being used to express action instruction icon 65. Action instruction icon 65 is expressed by combining action instruction display elements 86 in which positions, orientations, colors, and the like are changed. Action instruction display element 86 is stored in the structural data storage 32B.

Action instruction data generator 37B also includes an action force speed detector 46. Action force speed detector 46 determines instruction action force and instruction speed from the action of operator 30. The instruction action force and the instruction speed are sent to humanoid robot 1 as a part of action instruction data 54B. The instruction action force and the instruction speed are determined for each joint 12. When the manipulator having a state quantity associated with a portion other than the joint and from which the posture data is to be generated, the instruction action force and the instruction speed are also determined for the portion other than the joint.

Action force speed detector 46 calculates the action speed from the time series of operator posture data 64. The action speed is calculated from the values of operator posture data 64 at three or more points of time in order to reduce an error. An instantaneous speed that is a difference from the previous value may be used. When the calculated action speed is faster than an upper limit at which humanoid robot 1 is determined to be standstill, the magnitude of the instruction action force is determined such that the instruction action force increases with decreasing speed detected from the action. The speed detected from the action is multiplied by a proportional coefficient and the speed obtained by multiplying is set to the instruction speed. A force-speed conversion coefficient 87 is the proportional coefficient for each of operator posture data 64 for obtaining the instruction action force or the instruction speed, a constant used in a calculation formula, or the like. Force-speed conversion coefficient 87 is stored in structural data storage 32B. Action instruction data 54B includes the instruction speed and the instruction action force.

The instruction action force may be inputted in advance. The instruction action force may be inputted by stepping on a pedal or the like with a foot while action instruction is inputted using the arm. Any method in which the operator inputs the instruction action force may be used.

Actuator 13 corresponding to each portion of humanoid robot 1 outputs the force less than or equal to the instruction action force such that each portion of humanoid robot 1 moves at the instruction speed. The instruction action force is used as the upper limit of the force that is generated by humanoid robot 1 according to action instruction data 54B. When the action force (required action force) required to move each portion of humanoid robot 1 at the instruction speed is less than the instruction action force, corresponding actuator 13 generates the required action force. When the instruction action force is smaller than the required action force, the portion of humanoid robot 1 does not move, or moves slower than the instruction speed. The required action force is changed depending on the situation, in which the action is performed, such as a weight of object 20.

Instruction execution result detector 45 compares action instruction data 54B to posture data 52 after a predetermined time (action delay time) elapses, detects whether or not humanoid robot 1 can execute the action according to action instruction data 54B, and generates the detection result as action execution result data 67. The fact that the action of humanoid robot 1 does not follow action instruction data 54B is referred to as "unexecuted". Instruction unexecuted posture data is posture data 52 in which action execution result data 67 being "unexecuted" is generated. Action instruction image generator 44 generates action instruction image 66 using instruction execution result data 67.

Instruction execution result detector 45 obtains a difference between action instruction data 54B and posture data 52 after the action delay time for each joint. When the difference is smaller than or equal to a threshold, it is determined that joint 12 is executed according to action instruction data 54B (normal). Instruction execution result data 67 is generated as normal. When the difference is larger than the threshold, it is determined that the operation is not executed according to action instruction data 54B (unexecuted). Instruction execution result data 67 is generated as "unexecuted". In order to reduce an influence of a detection error of posture data 52, instruction execution result data 67 is not generated for action instruction data 54B at one point of time, but instruction execution result data 67 may be generated for action instruction data 54B at multiple points of time.

When all instruction execution result data 67 are normal, action instruction image generator 44 displays action instruction icon 65 on the back side at the same position as manipulator image 59. When all instruction execution result data 67 are normal, action instruction icon 65 may not be displayed. When instruction execution result data 67 that is "unexecuted" exists, namely, in a case where there exists instruction unexecuted posture data, action instruction icon 65 is displayed at the position apart from manipulator image 59 with respect to the joint corresponding to instruction execution result data 67 that is "unexecuted". The positional relationship between action instruction icon 65 and manipulator image 59 may be changed depending on the magnitude of the difference between action instruction data 54B associated with instruction execution result data 67 that is "unexecuted" and posture data 52 after the action delay time.

As an example, the situation in which the arm moves is considered. When instruction execution result data 67 is normal with respect to the motion of the shoulder joint and instruction execution result data 67 is "unexecuted" with respect to the motion of the elbow joint, the hand side from the forearm in action instruction icon 65 is displayed at the position apart from manipulator image 59. When instruction execution result data 67 is "unexecuted" with respect to the motion of the shoulder joint and instruction execution result data 67 is normal with respect to the motion of the elbow joint, the entire arm including the upper arm in action instruction icon 65 is displayed at the position apart from manipulator image 59.

When the instruction action force included in action instruction data 54B is smaller than the action force (required action force) required for the action instructed by action instruction data 54B, the corresponding joint does not move according to the instruction. FIG. 14(B) illustrates the case where forearm 11C and hand 11D of humanoid robot 1 holding object 20 cannot move when the instruction action force is smaller than the required action force. Forearm 11C and hand 11D do not move, but action instruction icon 65 is displayed at the position instructed to move. In FIG. 14(A), the instruction action force is greater than or equal to the required action force, forearm 11C and hand 11D can move while holding object 20. Action instruction icon 65 is displayed on the back side at the same position as forearm 11C and hand 11D.

Humanoid robot 1 has a limit value regarding at least one of the force or torque generated at each joint 12, moving speed, and rotational angular speed. At least a part of the limit values can be changed. Humanoid robot 1 operates so as not to exceed the limit value. Posture data 52 associated with the limit value is referred to as limit value-associated posture data 52. When action instruction data 54B which causes limit value-associated posture data 52 to exceed the limit value is inputted, limit value-associated posture data 52 cannot change according to action instruction data 54B due to the limit value. As to limit value-associated posture data 52, action instruction data 54B is not executed, and instruction execution result detector 45 detects that action instruction data 54B is not executed.

Presentation image generator 36B generates action instruction display captured image 68 in which action instruction image 66 including action instruction icon 65 is superimposed on tactile display captured image 62. Action instruction display captured image 68 is displayed on head mount display 4 as presentation image 50B.

Figure 15:
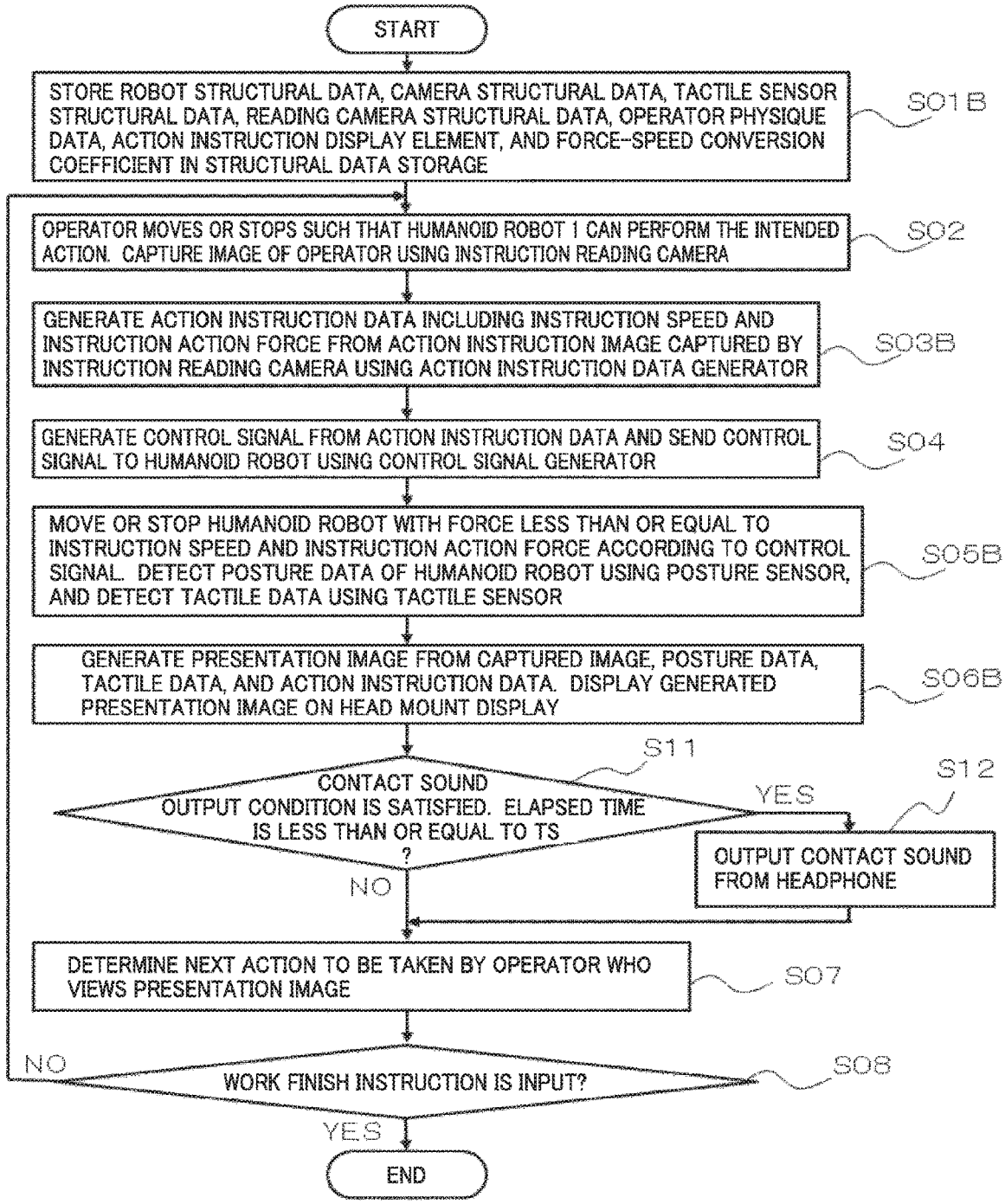
FIG. 15 is a flowchart illustrating a procedure for controlling the humanoid robot remotely using the remote control manipulator system of the third embodiment.

The operation is described. FIG. 15 is a flowchart illustrating a procedure for controlling the humanoid robot remotely using the remote control manipulator system of the third embodiment. Points different from those in FIG. 12 of the second embodiment are described.

In step S01B, action instruction display element 86 and the force-speed conversion coefficient 87 are also stored in structural data storage 32B.

In step S03B, action instruction data generator 37B generates action instruction data 54B from action instruction input images 63A, 63B captured by instruction reading cameras 6A, 6B. Action instruction data 54B includes the instruction speed and the instruction action force.

In step S05B, humanoid robot 1 that receives the control signal takes the posture or moves according to action instruction data 54B included in the control signal. Each portion of humanoid robot 1 operates with the instruction action force as the upper limit of the force outputted by corresponding actuator 13 so as to move at the instruction speed included in action instruction data 54B. Actuator 13 in which the instruction action force is designated generates the force less than or equal to the instruction action force.

In step S06B, action instruction display captured image 68 is generated from captured image 51, posture data 52, tactile data 53, and action instruction data 54B. Action instruction display captured image 68 is displayed on head mount display 4 as presentation image 50.

In action instruction display captured image 68, action instruction icon 65 representing the action instructed by operator 30 is displayed together with captured image 51. When the action can be executed according to the instruction, action instruction icon 65 is displayed on the back layer while superimposed on humanoid robot 1 in captured image 51 and manipulator image 59. When the action cannot be executed according to the instruction, action instruction icon 65 is displayed at the position apart from humanoid robot 1 in captured image 51 and manipulator image 59. Thus, operator 30 can determine easily whether or not humanoid robot 1 is controlled remotely according to the instruction from presentation image 50.

Whether or not humanoid robot 1 can operate according to the instruction depends on whether or not operator 30 performs the action to generate action instruction data 54B that causes humanoid robot 1 to generate the action force required for the action. For this reason, operator 30 can efficiently learn the characteristics of humanoid robot 1 or manipulator, which is controlled by operator 30 remotely, by performing the remote control while viewing action instruction display captured image 68.

Fourth Embodiment

Figure 16:
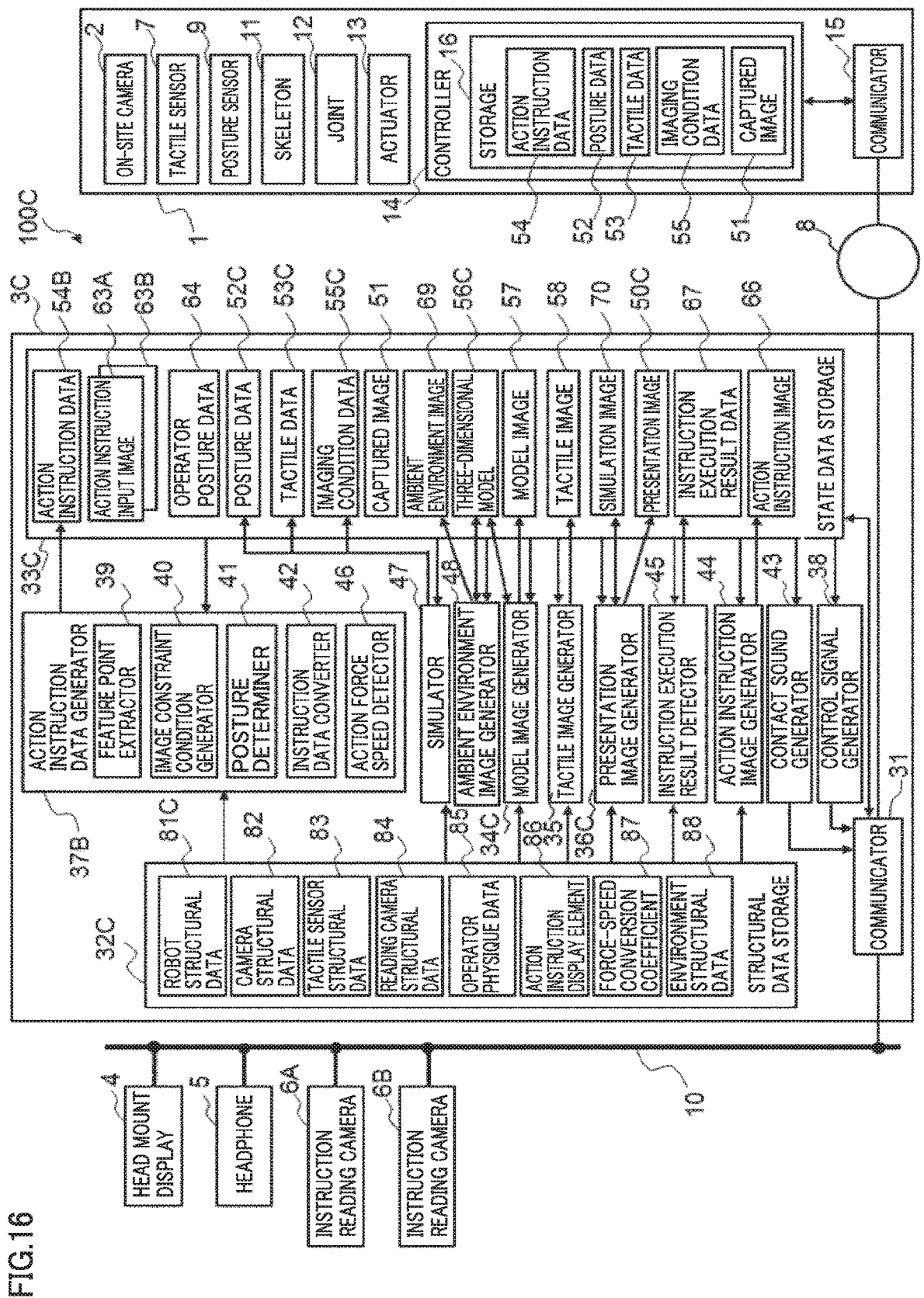
FIG. 16 is a block diagram illustrating a functional configuration of a remote control manipulator system according to a fourth embodiment of the present disclosure.

A fourth embodiment is the case where the third embodiment is modified so as to have a simulation function such that the operator can practice to become skilled in the remote control of the humanoid robot. FIG. 16 is a block diagram illustrating a functional configuration of a remote control manipulator system according to the fourth embodiment of the present disclosure. Points different from those in FIG. 13 of the third embodiment are described.

Control device 3C constituting remote control manipulator system 100C includes a simulator 47 and an ambient environment image generator 48. A structural data storage 32C, a state data storage 33C, a model image generator 34C, and a presentation image generator 36C are modified.

Structural data storage 32C stores also environment structural data 88 representing structural data associated with an ambient environment where humanoid robot 1 exists. Object 20 is included in the ambient environment. Examples of environment structural data 88 include the weight and shape of object 20 and vertical or horizontal lengths and a height to a ceiling of a room where humanoid robot 1 is located. Robot structural data 81C also stores structural data required for a simulation of the action of actuator 13.

State data storage 33C stores posture data 52C, tactile data 53C, imaging condition data 55C, a three-dimensional model 56C, an ambient environment image 69, and a simulation image 70. Posture data 52C, tactile data 53C, and imaging condition data 55C are recorded by simulator 47 while simulator 47 operates. When humanoid robot 1 is actually controlled remotely, the value received by communicator 31 is stored. In state data storage 33C, when simulator 47 operates, posture data 52C, tactile data 53C, and imaging condition data 55C may be recorded at and referred to a region different from the region used when humanoid robot 1 is controlled remotely, or may be recorded at and referred to the same region.

Simulator 47 refers to structural data storage 32C and state data storage 33C and simulates the action of humanoid robot 1. Simulator 47 performs the simulation such that a simulation result for action instruction data 54B is obtained at a point of time when the action delay time elapses after action instruction data 54B is inputted. Simulator 47 outputs posture data 52C, tactile data 53C, and imaging condition data 55C, which are obtained as a result of the simulation. Because on-site camera 2 is installed on head 11E of humanoid robot 1, there exists a case in which the position of on-site camera 2 is changed due to the action of humanoid robot 1. Simulator 47 also outputs imaging condition data 55C including the position of on-site camera 2.

During the simulation, three-dimensional model 56C is a three-dimensional model representing not only humanoid robot 1 but also the three-dimensional position and shape of the ambient environment. When humanoid robot 1 is actually controlled remotely, three-dimensional model 56C is a three-dimensional model of only humanoid robot 1. Three-dimensional model of humanoid robot 1 is generated by model image generator 34C, and the three-dimensional model of the ambient environment is generated by ambient environment image generator 48. The three-dimensional model generator that generates the three-dimensional model 56C of humanoid robot 1 and the ambient environment during the simulation may be provided separately from model image generator 34C and ambient environment image generator 48.

The position of on-site camera 2 is changed depending on the action of the humanoid robot 1 simulated by simulator 47. Ambient environment image 69 is an image in which the ambient environment is viewed from the position of on-site camera 2. Ambient environment image generator 48 refers to environment structural data 88, posture data 52C, and three-dimensional model 56C and generates ambient environment image 69. Ambient environment image 69 generated during the simulation is used instead of captured image 51 that is captured when the simulation is not performed. For each pixel of ambient environment image 69, the distance from on-site camera 2 to the object displayed on the pixel is stored.

Model image generator 34C refers to posture data 52C outputted from simulator 47 and robot structural data 81 and generates model image 57 during the simulation. As to model image 57, the distance from on-site camera 2 to the portion of three-dimensional model 56 displayed on the pixel is stored correspondingly to the pixel displaying manipulator image 59.

When the three-dimensional position of each portion of humanoid robot 1 determined from posture data 52C generated by simulator 47 coincides with the position where object 20 exists, tactile data 53C indicating "being in contact" is generated.

Presentation image generator 36C generates simulation image 70 by superimposing model image 57 on ambient environment image 69 during the simulation. Model image 57 is superimposed on ambient environment image 69 such that manipulator image 59 included in model image 57 is displayed in preference to ambient environment image 69. Specifically, manipulator image 59 is displayed also in simulation image 70 at the pixels where manipulator image 59 is displayed in model image 57. For example, in the simulation, when the three-dimensional position of object 20 is located closer to on-site camera 2 than humanoid robot 1 and object 20 hides humanoid robot 1, object 20 is displayed in ambient environment image 69 at the pixels (referred to as a pixel XX), and manipulator image 59 is displayed in model image 57 at pixel XX. In simulation image 70, only manipulator image 59 or manipulator image 59 and object 20 are displayed at the pixel XX. Simulation image 70 is an image in which three-dimensional model 56C including humanoid robot 1 and the ambient environment is viewed from the position of on-site camera 2 with referring to posture data 55C outputted from simulator 47 and structural data storage 32.

Ambient environment image generator 48, model image generator 34C, and presentation image generator 36C constitute the simulation image generator that generates simulation image 70.

Presentation image generator 36C generates an action instruction display simulation image 71 in which tactile image 58 including contact symbol 60 and action instruction image 66 including action instruction icon 65 are further superimposed on simulation image 70. Action instruction display simulation image 71 is displayed on head mount display 4 as presentation image 50.

Figure 17:
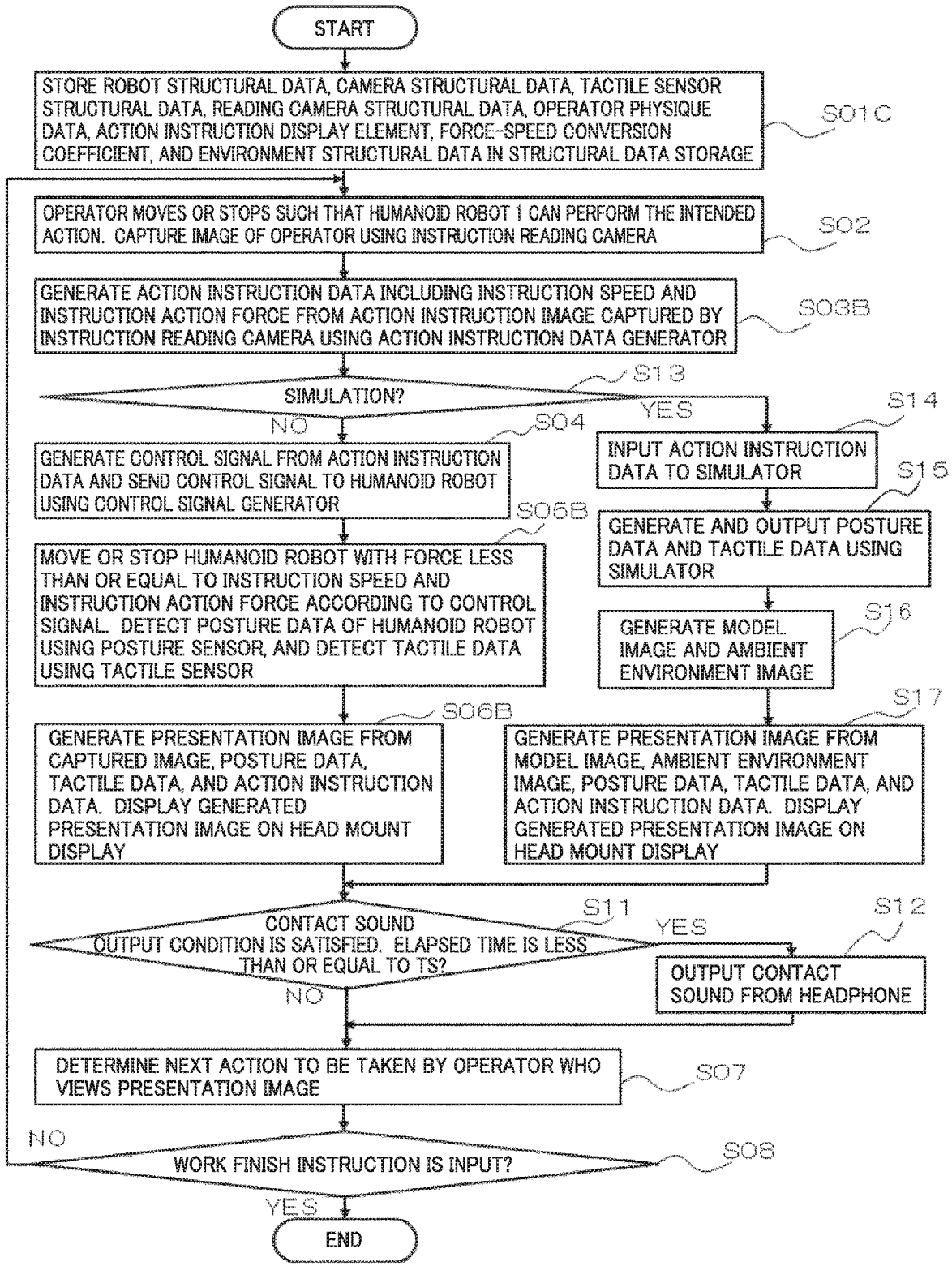
FIG. 17 is a flowchart illustrating a procedure for controlling the humanoid robot remotely using the remote control manipulator system of the fourth embodiment.

The operation is described. FIG. 17 is a flowchart illustrating a procedure for controlling the humanoid robot remotely using the remote control manipulator system of the fourth embodiment. Points different from those in FIG. 15 of the third embodiment are described.

In step S01C, environment structural data 88 is also stored in structural data storage 32C.

Step S13 of checking whether or not the simulation is performed is added before step S04 of sending the control signal to humanoid robot 1. When the simulation is not performed (NO in S13), steps S04 to S06B are performed.

When the simulation is performed (YES in S13), action instruction data 54B is inputted to simulator 47 in step S14. In step S15, simulator 47 performs the simulation such that humanoid robot 1 takes the action instructed by action instruction data 54B. As a result of the simulation, posture data 52C, tactile data 53C, and imaging condition data 55C are generated and outputted. In step S16, model image generator 34C generates model image 57 from posture data 52C and imaging condition data 55C, which are outputted from simulator 47, and ambient environment image generator 48 generates ambient environment image 69.

In step S17, presentation image generator 36C generates action instruction display simulation image 71 from model image 57, ambient environment image 69, posture data 52C, tactile data 53C, imaging condition data 55C, and action instruction data 54B. Action instruction display simulation image 71 is presented to operator 30 as presentation image 50. Action instruction display simulation image 71 is displayed on head mount display 4 as presentation image 50. Step S07 is executed after step S17.

When simulator 47 is provided, operator 30 can more easily practice the operation of humanoid robot 1. For this reason, a skill of operator 30 to control humanoid robot 1 remotely can efficiently be acquired in a shorter period of time as compared with the case where simulator 47 is not provided.

Figure 18:
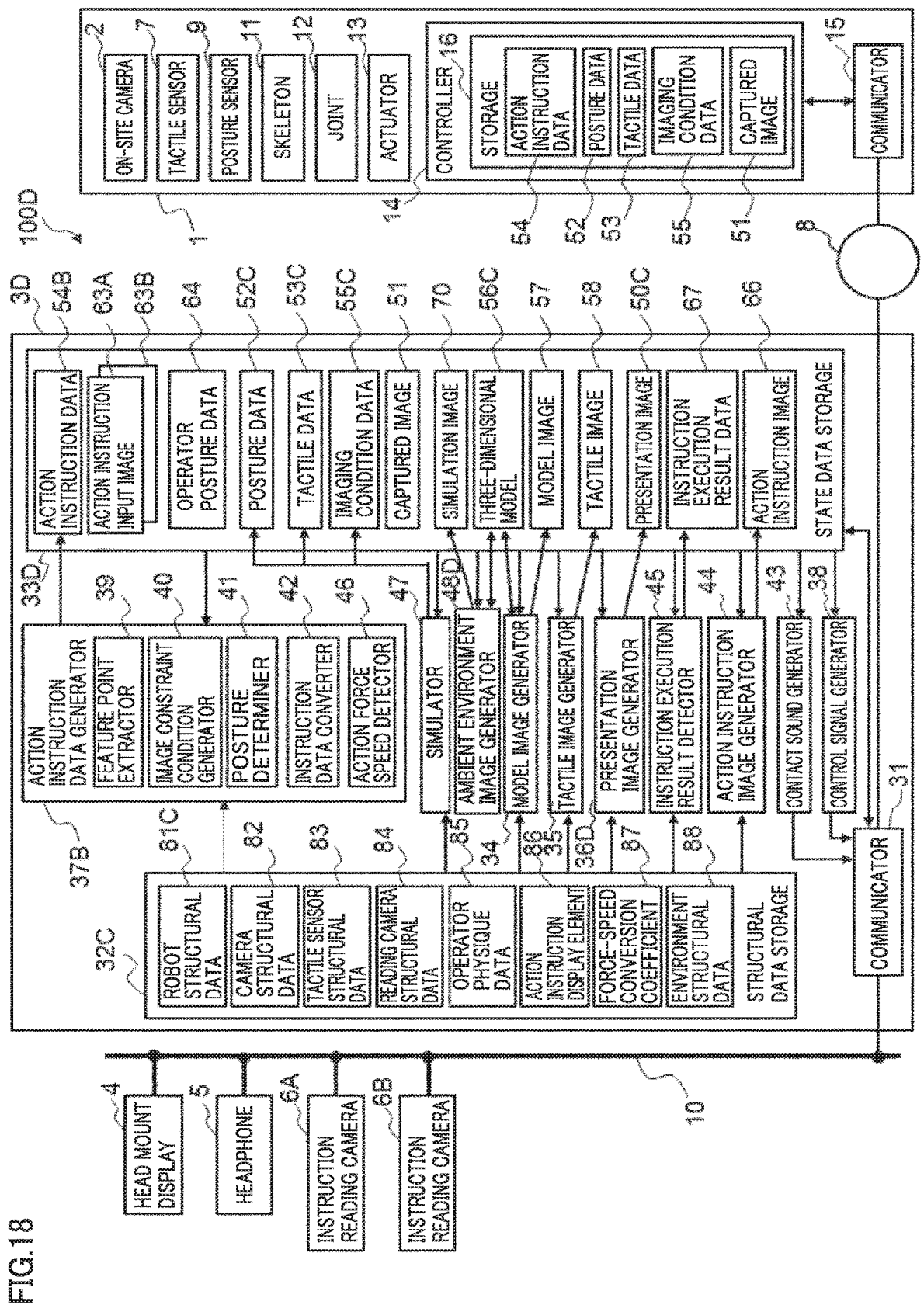
FIG. 18 is a block diagram illustrating a functional configuration of a remote control manipulator system according to a modification of the fourth embodiment.
Figure 19:
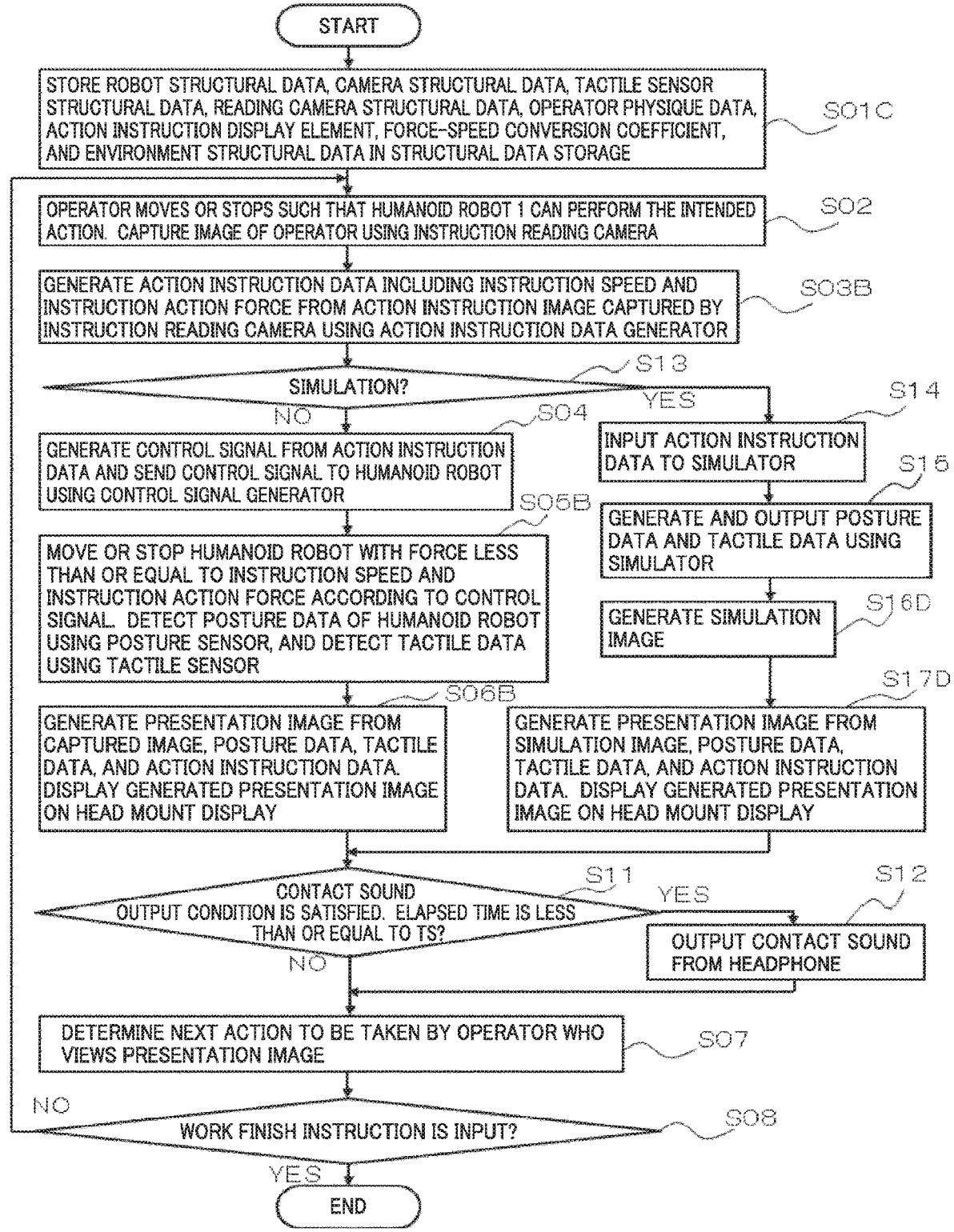
FIG. 19 is a flowchart illustrating a procedure for controlling the humanoid robot remotely using the remote control manipulator system of the modification of the fourth embodiment.

The control device may include the simulation image generator that generates the simulation image instead of the ambient environment image generator. A modification of the fourth embodiment including the simulation image generator is described with reference to FIGS. 18 and 19. FIG. 18 is a block diagram illustrating a functional configuration of a remote control manipulator system according to a modification of the fourth embodiment. FIG. 19 is a flowchart illustrating a procedure for controlling the humanoid robot remotely using the remote control manipulator system of the modification of the fourth embodiment.

A control device 3D constituting a remote control manipulator system 100D of the modification has a simulation image generator 48D instead of the ambient environment image generator 48 with respect to control device 3C. A state data storage 33D and a presentation image generator 36D are modified. Control device 3D includes model image generator 34 instead of model image generator 34C. Model image generator 34 operates only when humanoid robot 1 is controlled remotely, but does not operate during the simulation.

State data storage 33D does not store ambient environment image 69. Simulation image generator 48D generates three-dimensional model 56C, and generates simulation image 70 from three-dimensional model 56C. Simulation image generator 48D obtains the distances from on-site camera 2 to humanoid robot 1 or the ambient environment from three-dimensional model 56C, and generates simulation image 70 such that humanoid robot 1 or the ambient environment having the shorter distance is displayed. However, simulation image 70 is generated such that both manipulator image 59 and the image of the ambient environment are displayed at the pixels where object 20 exists at the closer position than humanoid robot 1. Simulation image generator 48D generates simulation image 70 in which manipulator image 59 is displayed in preference to the ambient environment.

Presentation image generator 36C generates action instruction display simulation image 71 in which tactile image 58 including contact symbol 60 and action instruction image 66 including action instruction icon 65 are superimposed on simulation image 70. Action instruction display simulation image 71 is displayed on head mount display 4 as presentation image 50.

Points different between FIGS. 19 and 17 are described. In step S16D, simulation image generator 48D generates simulation image 70. In step S17D, presentation image generator 36C generates action instruction display simulation image 71 from simulation image 70, posture data 52C, tactile data 53C, imaging condition data 55C, and action instruction data 54B.

The simulation image generator may produce the model image and the ambient environment image, and produce the simulation image by superimposing the model image on the ambient environment image. Any simulation image generator can be used as long as the simulation image generator generates the simulation image being the image in which the manipulator model and the ambient environment are viewed from the position of the camera, referring to the posture data outputted from the simulator and the structural data storage.

The simulator may not simulate tactile sensor 7, and may not output the tactile data. The simulator may simulate tactile sensor 7, but may not generate the action instruction image. The control device that controls the humanoid robot that does not include the tactile sensor or the control device that does not include the action instruction image generator may include the simulator.

Fifth Embodiment

Figure 20:
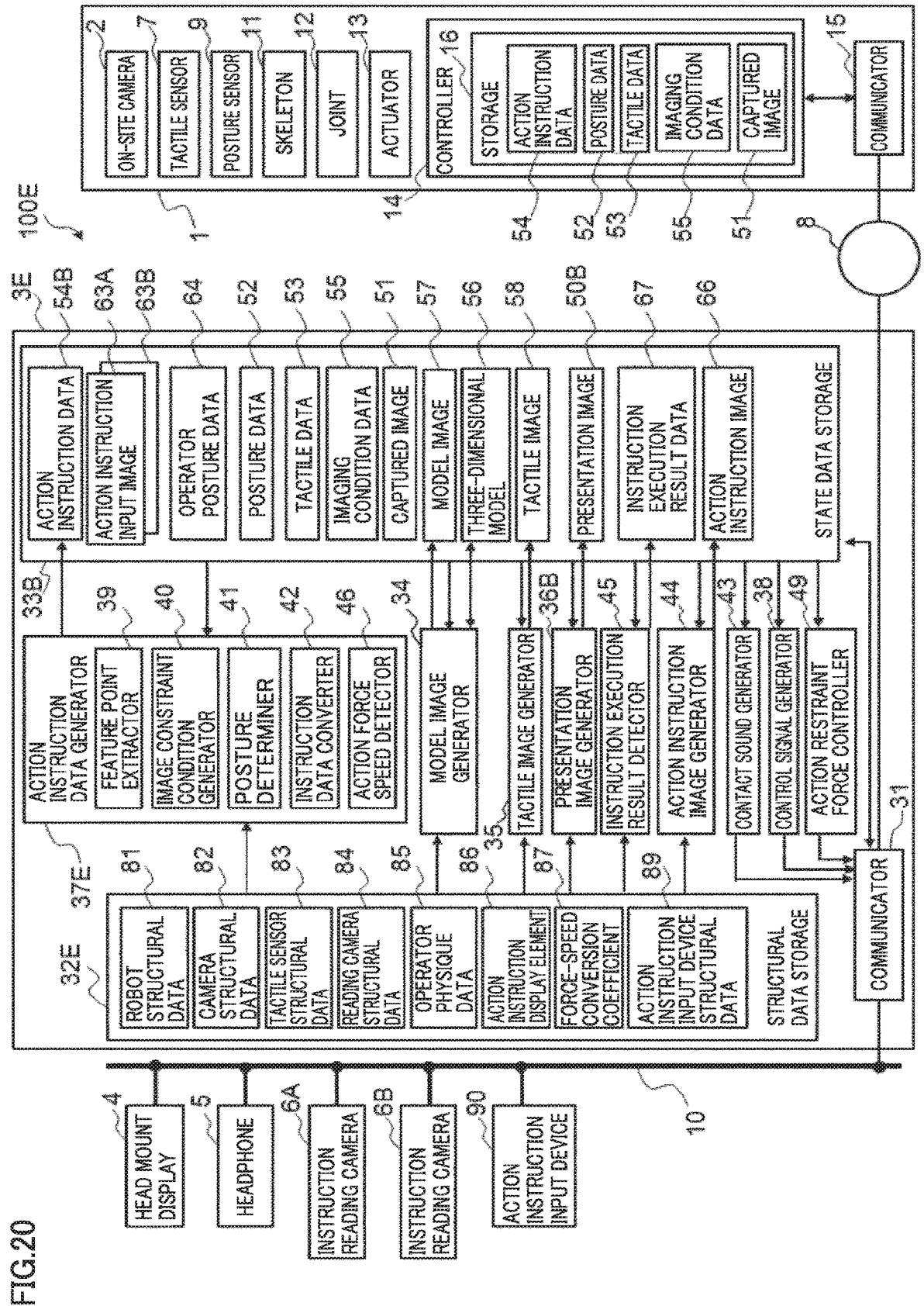
FIG. 20 is a block diagram illustrating a functional configuration of a remote control manipulator system according to a fifth embodiment of the present disclosure.

In a fifth embodiment, the third embodiment is modified such that the operator wears an exoskeleton type action instruction input device and the action instruction input device generates the force that prevents the motion of the operator when the action instruction is inappropriate. FIG. 20 is a block diagram illustrating a functional configuration of a remote control manipulator system according to the fifth embodiment of the present disclosure. Points different from those in FIG. 13 of the third embodiment are described.

Figure 21:
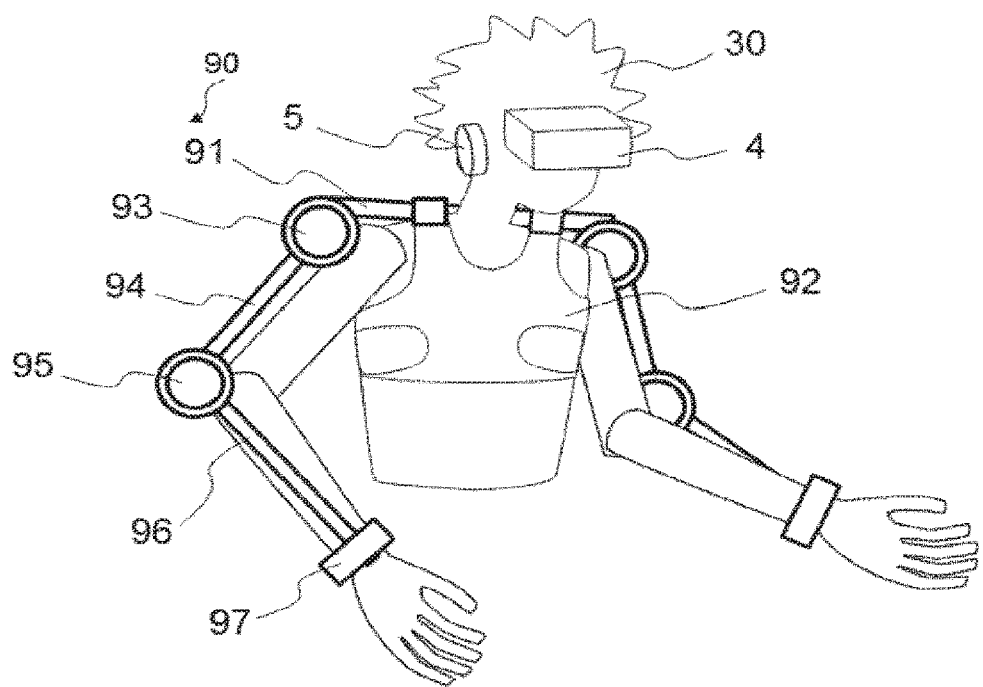
FIG. 21 is a view illustrating a structure of an exoskeleton type action instruction input device included in the remote control manipulator system of the fifth embodiment.

Operator 30 wears an exoskeleton type action instruction input device 90. FIG. 21 is a view illustrating a structure of the exoskeleton type action instruction input device included in the remote control manipulator system of the fifth embodiment. Action instruction input device 90 includes a shoulder connecting frame 91, a shoulder mounting band 92, left and right shoulder joint measurers 93, left and right upper arm frames 94, left and right elbow joint measurers 95, and left and right forearm frames 96, and a wrist mounting band 97. Shoulder connecting frame 91 is a frame that connects the positions of two shoulders. Shoulder mounting band 92 mounts the shoulder connecting frame 91 near the left and right shoulders of operator 30. Wrist mounting band 97 mounts forearm frames 96 to the left and right wrists of operator. The lengths of shoulder connecting frame 91, upper arm frame 94, and forearm frame 96 can be adjusted depending on the physique of operator 30. The action instruction input device may be an endoskeleton type action instruction input device.

In normal operation, shoulder joint measurer 93 measures the angle formed between upper arm frame 94 and shoulder connecting frame 91 without preventing the action of operator 30. Shoulder joint measurer 93 measures two angles of the rotation in the front-rear direction and the rotation in the left-right direction as the angle formed between upper arm frame 94 and shoulder connecting frame 91. Elbow joint measurer 95 measures the angle formed between forearm frame 96 and upper arm frame 94 as the rotation angle of the two rotational degrees of freedom.

When shoulder joint 12A or elbow joint 12B of humanoid robot 1 cannot move according to the action instruction inputted by operator 30, shoulder joint 12A or elbow joint 12B that cannot move according to the action instruction, namely, the portion where the action instruction is not executed, generates the force (referred to as resistance force) preventing the action of operator 30. Each of shoulder joint measurer 93 and elbow joint measurer 95 is also an action restraint force generator that generates the resistance force. An example of the case where humanoid robot 1 cannot move according to the action instruction is the case where operator 30 moves at the speed exceeding the speed at which humanoid robot 1 can move. The resistance force is generated by an electromagnetic solenoid, an electrorheological fluid, an electric brake, or the like. When the posture data is defined for a portion other than the joint, the resistance force may be generated at the portion corresponding to the posture data.

As to left and right shoulder joints 12A and elbow joints 12B of humanoid robot 1, an action instruction data generator 37E generates action instruction data 54B from the angles measured by left and right shoulder joint measurers 93 and elbow joint measurers 95. As to portions other than shoulder joint 12A and elbow joint 12B, action instruction data generator 37E generates action instruction data 54B from action instruction input images 63A, 63B.

Humanoid robot 1 changes the angle of joint 12 by the expansion and contraction of actuator 13. The arrangement of actuator 13 is the same as that of a human muscle, and shoulder joint 12A and elbow joint 12B have two rotational degrees of freedom. Shoulder joint measure 93 and elbow joint measure 95 output the measured rotation angles as the rotation angles to be taken by shoulder joint 12A and elbow joint 12B of humanoid robot 1.

A control device 3E constituting a remote control manipulator system 100E includes an action restraint force controller 49. When instruction execution result data 67 shows that the instruction is not executed for left and right shoulder joints 12A and elbow joints 12B of humanoid robot 1, action restraint force controller 49 controls corresponding shoulder joint measurer 93 or elbow joint measurer 95 so as to generate the resistance force. The magnitude of the resistance force is changed depending on the difference between action instruction data 54B and posture data 52 after the action delay time. Shoulder joint measurer 93 or elbow joint measurer 95 to which action restraint force controller 49 sends the control signal for generating the resistance force corresponds to joint 12 in which action instruction icon 65 is displayed separately from manipulator image 59.

Action instruction input device structural data 89 defining the structure of action instruction input device 90 is also stored in a structural data storage 32E. In action instruction input device structural data 89, for each instruction execution result data 67 the corresponding joint measurer (action restraint force generator) of action command input device 90 is defined.

Figure 22:
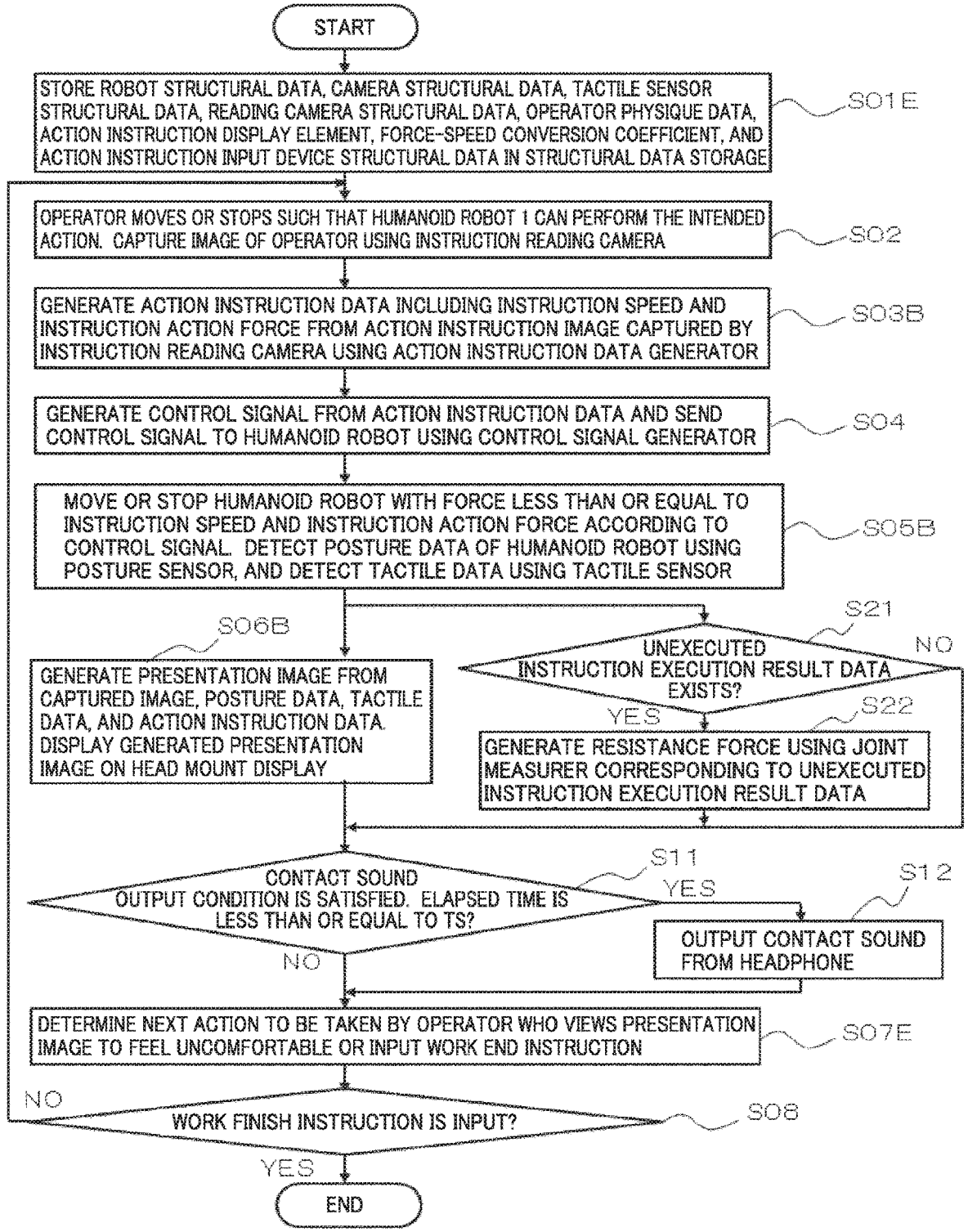
FIG. 22 is a flowchart illustrating a procedure for controlling the humanoid robot remotely using the remote control manipulator system of the fifth embodiment.

The operation is described. FIG. 22 is a flowchart illustrating a procedure for controlling the humanoid robot remotely using the remote control manipulator system of the fifth embodiment. Points different from those in FIG. 15 of the third embodiment are described.

In step S01E, action instruction input device structural data 89 is also stored in structural data storage 32E.

In parallel to step S06B of generating action instruction display captured image 68 as presentation image 50, steps S21 and S22 are executed. In step S21, it is checked whether or not there exists unexecuted instruction execution result data 67 for shoulder joint 12A and elbow joint 12B. When unexecuted instruction execution result data 67 exists (YES in S21), the resistance force is generated in the joint measurer associated with posture data 52 corresponding to unexecuted instruction execution result data 67 in step S22.

Figure 23:
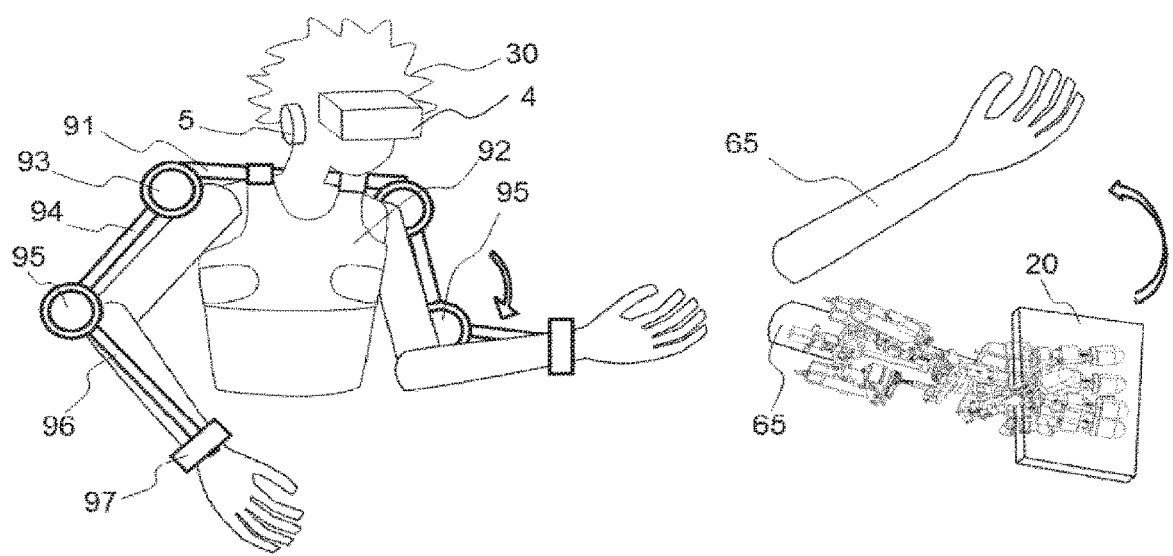
FIG. 23 is a view illustrating a state in which resistance force is generated when the humanoid robot is controlled remotely using the remote control manipulator system of the fifth embodiment.

FIG. 23 is a view illustrating a state in which the resistance force is generated when the humanoid robot is controlled remotely using the remote control manipulator system of the fifth embodiment. FIG. 23 illustrates the case where operator 30 bends the elbow joint too quickly. In presentation image 50, action instruction icons 65 of the forearm and the hand are displayed at the positions apart from humanoid robot 1. At the same time, elbow joint measurer 95 generates the resistance force. Generating the resistance force causes operator 30 to feel that the smooth motion of the elbow joint is prevented.

In step S07E, when the resistance force is generated at the same time as operator 30 views presentation image 50, operator 30 feels the resistance force, and determines the next action to be performed. Alternatively, operator 30 inputs an instruction to finish the work.

Not only the action instruction inputted by operator 30 is visually displayed, but also the operator can recognize the inappropriate action instruction by the resistance force generated by the action restraint force generator when the input action instruction is inappropriate as to the shoulder joint or the elbow joint. For this reason, the characteristics of humanoid robot 1 or the manipulator controlled remotely by operator 30 can be efficiently learned.

Each of wrist joint 12C and the finger joints of hand 11D of humanoid robot 1 may include the action instruction input device that is also used as the action restraint force generator that generates the resistance force. The action instruction input device that inputs at least a part of the action instructions may be such action instruction input device that is also used as the action restraint force generator. Operator 30 may wear the action restraint force generation device (action restraint force generator) that is not used as the action instruction input device.

The simulator that can also generate the resistance force preventing the action of the operator when the action instruction is inappropriate.

In the present disclosure, a free combination of the embodiments or a modification or omission of each embodiment can be made without departing from the scope of the present disclosure.

REFERENCE SIGNS LIST

100, 100A, 100B, 100C, 100D, 100E: remote control manipulator system
- 1: humanoid robot (manipulator)
- 2: on-site camera (camera)
- 3, 3A, 3B, 3C, 3D, 3E: control device
- 4: head mount display (display device)
- 5: headphone (sound generator)
- 6A, 6B: instruction reading camera (action instruction inputter)
- 7: tactile sensor
- 8: communication line
- 9: posture sensor
- 10: LAN
- 11: skeleton
- 11A: trunk
- 11B: upper arm
- 11C: forearm
- 11D: hand
- 11E: head
- 12: joint
- 12A: shoulder joint
- 12B: elbow joint
- 12C: wrist joint
- 12D: neck joint
- 13: actuator
- 14: controller
- 15: communicator
- 16: storage
- 20: object
- 30: operator
- 21: CPU (Central processing unit)
- 22: memory
- 31: communicator
- 32, 32B, 32C, 32E: structural data storage
- 33, 33B, 33C, 33D: state data storage
- 34: model image generator
- 34C: model image generator (simulation image generator)
- 35: tactile image generator
- 36, 36B, 36D: presentation image generator
- 36C: presentation image generator (simulation image generator)
- 37, 37B, 37E: action instruction data generator (action instruction inputter)
- 38: control signal generator
- 39: feature point extractor
- 40: image constraint condition generator
- 41: posture determiner
- 42: instruction data converter
- 43: contact sound generator (sound controller)
- 44: action instruction image generator
- 45: instruction execution result detector
- 46: action force speed detector
- 47: simulator
- 48: ambient environment image generator (simulation image generator)
- 48D: simulation image generator
- 49: action restraint force controller
- 50, 50B, 50C: presentation image
- 51: captured image
- 52, 52C: posture data
- 53, 53C: tactile data
- 54, 54B: action instruction data
- 55, 55C: imaging condition data
- 56: three-dimensional model
- 57: model image
- 58: tactile image
- 59: manipulator image
- 60: contact symbol
- 61: model display captured image
- 62: tactile display captured image
- 63A, 63B: action instruction input image
- 64: operator posture data
- 65: action instruction icon
- 66: action instruction image
- 67: instruction execution result data
- 68: action instruction display captured image
- 69: ambient environment image
- 70: simulation image
- 71: action instruction display simulation image
- 81, 81C: robot structural data (manipulator structural data)
- 82: camera structural data
- 83: tactile sensor structural data
- 84: reading camera structural data
- 85: operator physique data
- 86: action instruction display element
- 87: force-speed conversion factor
- 88: environment structural data
- 89: action instruction input device structural data
- 90: action instruction input device (action instruction inputter, action restraint force generator)
- 91: shoulder connecting frame
- 92: shoulder wearing band
- 93: shoulder joint measurer
- 94: upper arm frame
- 95: elbow joint measurer
- 96: forearm frame
- 97: wrist wearing band

The invention claimed is:

1. A remote control manipulator system, comprising:
a manipulator controlled remotely by an operator to handle an object;
a camera to capture a captured image including the manipulator;
a posture sensor to detect posture data including a position and a posture of the manipulator;
an action instruction interlace with which the operator inputs an action instruction instructing action to move or stop the manipulator;
control circuitry configured to
generate a control signal controlling the manipulator from the inputted action instruction,
store, in a memory, manipulator structural data representing a structure of the manipulator,
generate a model image including a manipulator image of a model of the manipulator viewed from a position of the camera, based on the stored manipulator structural data and the detected posture data, and generate a presentation image, to be presented to the operator, by superimposing the model image on the captured image by overlaying portions of the manipulator in the manipulator image in pixels where the manipulator is not captured in the captured image and by not displaying portions of the manipulator in the manipulator image in pixels where the manipulator is captured in the captured image; and a display to display the presentation image.

2. A remote control manipulator system, comprising:

a manipulator controlled remotely by an operator to handle an object;

a camera to capture a captured image including the manipulator;

a posture sensor to detect posture data including a position and a posture of the manipulator;

an action instruction interface with which the operator inputs an action instruction instructing action to move or stop the manipulator;

a tactile sensor to detect tactile data, indicating whether or not the manipulator is in contact with the object, control circuitry configured to generate a control signal controlling the manipulator from the inputted action instruction, store, in a memory, manipulator structural data representing a structure of the manipulator, generate a model image including a manipulator image of a model of the manipulator viewed from a position of the camera, based on the stored manipulator structural data and the detected posture data, generate a presentation image, to be presented to the operator, by superimposing the model image on the captured image by overlaying portions of the manipulator in the manipulator image, store, in the memory, tactile sensor structural data representing a structure of the tactile sensor, generate a tactile image including a contact symbol indicating a position at which the tactile sensor is in contact with the object by referring to the stored tactile sensor structural data and the tactile data, and generate the presentation image by further superimposing the generated tactile image on the captured image; and a display to display the presentation image.

3. The remote control manipulator system according to claim 2, wherein the tactile sensor detects the tactile data including a contact force acting between the manipulator and the object, and the control circuitry is further configured to generate the tactile image by changing the contact symbol depending on a magnitude of the contact force.

4. The remote control manipulator system according to claim 2, further comprising a sound generator, including an audio speaker, to generate sound that can be heard by the operator, wherein the control circuitry is further configured to generate the sound by controlling the sound generator according to the tactile data.

5. The remote control manipulator system according to claim 1, wherein the control circuitry is further configured to detect whether or not the posture data follows the action instruction, generate an action instruction image including an action instruction icon representing action following the action instruction when there exists instruction unexecuted posture data, the instruction unexecuted posture data being the detected posture data when the posture data does not follow the action instruction, and generate the presentation image by further superimposing the generated action instruction image on the captured image.

6. The remote control manipulator system according to claim 5, further comprising an action restraint force generator that is worn by the operator and is configured to generate a resistance force preventing an action of the operator, the action restraint generator including one of an electromagnetic solenoid, an electrorheological fluid, and an electric brake, wherein the control circuitry is further configured to control the action restraint force generator so as to generate the resistance force in a portion corresponding to the instruction unexecuted posture data when the control circuitry detects the instruction unexecuted posture data.

7. The remote control manipulator system according to claim 6, wherein the action restraint force generator also functions as the action instruction interface with which the operator inputs at least a part of the action instruction, and the control circuitry is further configured to generate the control signal using the action instruction inputted from the action instruction interface that also functions as the action restraint force generator.

8. The remote control manipulator system according to claim 5, wherein the manipulator operates so as not to exceed a limit value associated with at least one of generating a force or a torque, a moving speed, and a rotational angular speed, and when the action instruction causing limit value-associated posture data, which is the posture data associated with the limit value, to exceed the limit value, is inputted, the control circuitry is further configured to detect, as the instruction unexecuted posture data, the limit value-associated posture data that does not follow the action instruction due to the limit value.

9. The remote control manipulator system according to claim 8, wherein the control circuitry is further configured to change the limit value.

10. The remote control manipulator system according to claim 1, wherein the action instruction includes instruction action force, and the manipulator generates force less than or equal to the instruction action force.

11. The remote control manipulator system according to claim 1, wherein the memory stores environment structural data being structural data associated with an ambient environment, including the object, in which the manipulator exists, and the control circuitry is further configured to simulate action of the manipulator in response to the action instruction and output the posture data by referring to the memory, generate a simulation image being an image in which the model of the manipulator and the ambient environment are viewed from the position of the camera by referring to the outputted posture data and the memory, and generate the presentation image using the simulation image.

12. A control device, comprising:
control circuitry configured to
receive an action instruction inputted by an operator using an action instruction interface and generate a control signal controlling a manipulator to handle an object;
store, in a memory, manipulator structural data representing a structure of the manipulator;
generate a model image including a manipulator image of a model of the manipulator viewed from a position of a camera, based on posture data of the manipulator and the stored manipulator structural data, the control circuitry receiving the posture data representing a position and a posture of the manipulator detected by a posture sensor and a captured image including the manipulator captured by the camera; and
generate a presentation image, to be presented to the operator, by superimposing the model image on the captured image by overlaying portions of the manipulator in the manipulator image in pixels where the manipulator is not captured in the captured image and by not displaying portions of the manipulator in the manipulator image in pixels where the manipulator is captured in the captured image.

13. A control device, comprising:
control circuitry configured to
receive an action instruction inputted by an operator using an action instruction interface and generate a control signal controlling a manipulator to handle an object;
store, in a memory, manipulator structural data representing a structure of the manipulator;
generate a model image including a manipulator image of a model of the manipulator viewed from a position of a camera, based on posture data of the manipulator and the stored manipulator structural data, the control circuitry receiving the posture data representing a position and a posture of the manipulator detected by a posture sensor and a captured image including the manipulator captured by the camera; and
generate a presentation image, to be presented to the operator, by superimposing the model image on the captured image, wherein
tactile data is inputted from a tactile sensor that detects the tactile data, which represents whether or not the manipulator is in contact with the object,
the memory stores tactile sensor structural data representing a structure of the tactile sensor, and
the control circuitry is further configured to
generate a tactile image including a contact symbol indicating a position at which the tactile sensor is in contact with the object by referring to the stored tactile sensor structural data and the detected tactile data, and
generate the presentation image by further superimposing the generated tactile image on the captured image.

14. The control device according to claim 13,
wherein the tactile data includes a contact force acting between the manipulator and the object, and
the control circuitry is further configured to generate the tactile image by changing the contact symbol depending on a magnitude of the contact force.

15. The control device according to claim 13, wherein control circuitry is further configured to generate sound by controlling a sound generator that includes an audio speaker and generates the sound that can be heard by the operator according to the tactile data.

16. The control device according to claim 12, wherein the control circuitry is further configured to
detect whether or not the posture data follows the action instruction;
generate an action instruction image including an action instruction icon representing action following the action instruction when there exists instruction unexecuted posture data, the instruction unexecuted posture data being the detected posture data when the posture data does not follow the action instruction, and
generate the presentation image by further superimposing the generated action instruction image on the captured image.

17. The control device according to claim 16, wherein the control circuitry is further configured to
control an action restraint force generator so as to generate a resistance force in a portion of the action restraint force generator corresponding to the instruction unexecuted posture data when the control circuitry detects the instruction unexecuted posture data, the action restraint force generator being worn by the operator and being configured to generate the resistance force preventing an action of the operator, the action restraint generator including one of an electromagnetic solenoid, an electrorheological fluid, and an electric brake.

18. The control device according to claim 17, wherein
the action restraint force generator also functions as the action instruction interface with which the operator inputs at least a part of the action instruction, and
the control circuitry is further configured to generate the control signal using the action instruction inputted from the action instruction interface that also functions as the action restraint force generator.

19. The control device according to claim 16, wherein
the manipulator operates so as not to exceed a limit value associated with at least one of generating a force or a torque, a moving speed, and a rotational angular speed, and
when the action instruction causing limit value-associated posture data, which is the posture data associated with the limit value, to exceed the limit value, is inputted, the control circuitry is further configured to detect, as the instruction unexecuted posture data, the limit value-associated posture data that does not follow the action instruction due to the limit value.

20. The control device according to claim 12, wherein the control circuitry is further configured to:
simulate action of the manipulator in response to the action instruction and output the posture data by referring to the memory;
generate a simulation image being an image in which the model of the manipulator and the ambient environment are viewed from the position of the camera by referring to the memory and using the outputted posture data,
store, in the memory, environment structural data being structural data associated with an ambient environment, including the object, in which the manipulator exists, and
generate the presentation image using the simulation image.

* * * * *